United States Patent
Spivey et al.

(10) Patent No.: US 8,496,329 B2
(45) Date of Patent: *Jul. 30, 2013

(54) LOW INVENTORY METHOD OF MAKING EYEGLASSES

(76) Inventors: Brett Spivey, Carlsbad, CA (US); Andreas Dreher, Escondido, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 13/068,072

(22) Filed: May 2, 2011

(65) Prior Publication Data

US 2012/0057124 A1    Mar. 8, 2012

Related U.S. Application Data

(63) Continuation-in-part of application No. 12/012,743, filed on Feb. 4, 2008, now Pat. No. 7,934,831, which is a continuation-in-part of application No. 11/607,130, filed on Nov. 29, 2006, now Pat. No. 7,325,922, which is a continuation-in-part of application No. 11/085,436, filed on Mar. 21, 2005, now Pat. No. 7,372,646, and a continuation-in-part of application No. 11/243,944, filed on Oct. 5, 2005, now Pat. No. 7,232,217, and a continuation-in-part of application No. 11/387,023, filed on Mar. 21, 2006, now Pat. No. 7,338,159, and a continuation-in-part of application No. 11/580,398, filed on Oct. 13, 2006, now abandoned.

(51) Int. Cl.
G02C 7/08    (2006.01)
G02C 7/02    (2006.01)

(52) U.S. Cl.
USPC ............ 351/159.75; 351/159.48; 351/159.52; 351/159.7

(58) Field of Classification Search
USPC ............... 351/159.48, 159.52, 159.7, 159.74, 351/159.75
See application file for complete search history.

(56) References Cited

U.S. PATENT DOCUMENTS 7,934,831 B2 *   5/2011   Spivey et al. ............ 351/159.73

* cited by examiner

Primary Examiner — Scott J Sugarman
(74) Attorney, Agent, or Firm — John R. Ross; John R. Ross, III

(57) ABSTRACT

A low inventory method of making eyeglasses. Two lens elements having special complementary surfaces are provided. These lens elements can be positioned relative to each other to provide wide ranges of focus correction and astigmatism correction. Various preferred embodiments of the invention are described. In one embodiment the required inventory is only identical sets of two complementary lenses for providing correction for almost all needed eye correction for a typical population. In this embodiment, the lens units are first adjusted relative to each other to provide a desired focusing power. Astigmatism may be corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

21 Claims, 24 Drawing Sheets

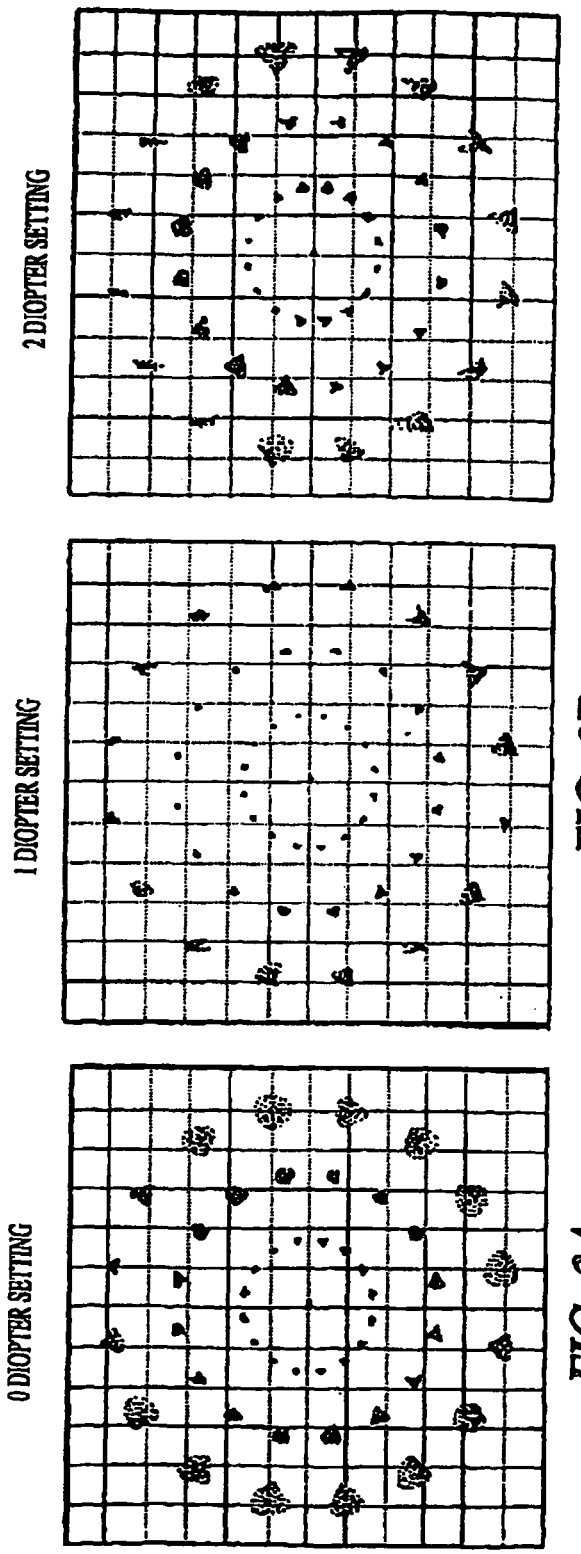

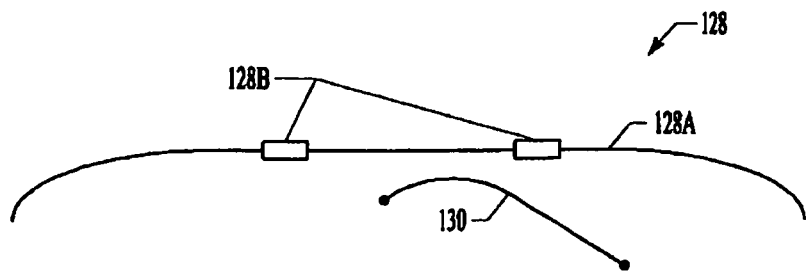
*FIG. 9F*
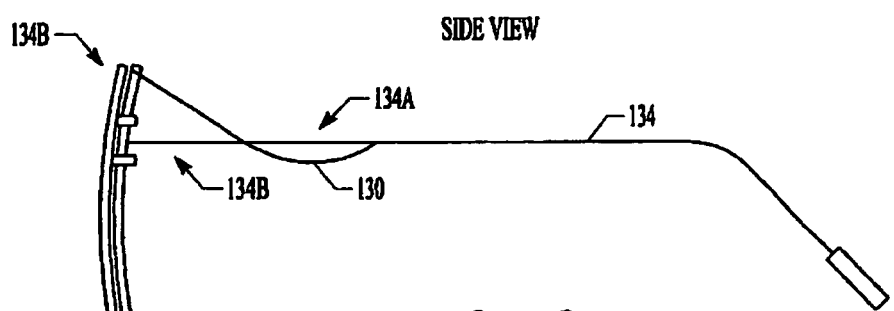
*FIG. 9G*
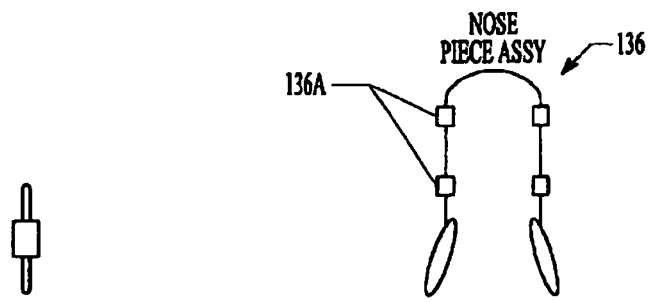
*FIG. 9H*   *FIG. 9I*

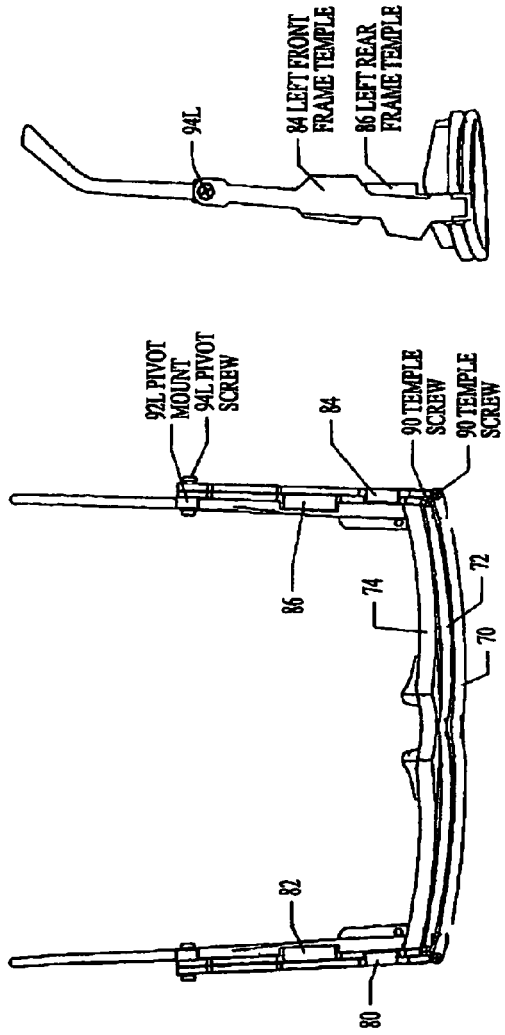
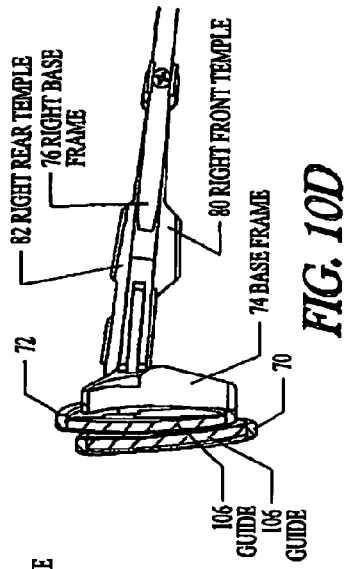
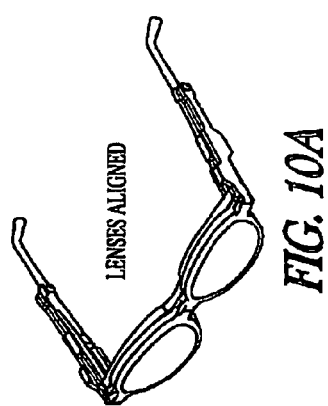
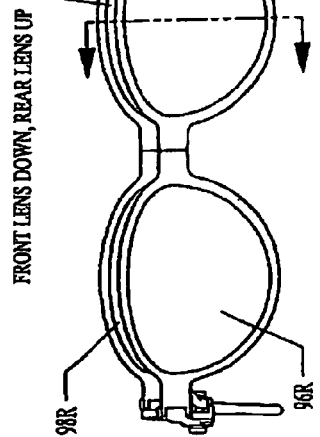

FRONT LENS UP, REAR LENS DOWN

FRONT AND REAR LENSES ALIGNED

FRONT LENS DOWN, REAR LENS UP

FRAME ALIGNED

FRONT FRAME UP
REAR FRAME DOWN

FRONT FRAME DOWN
REAR FRAME UP

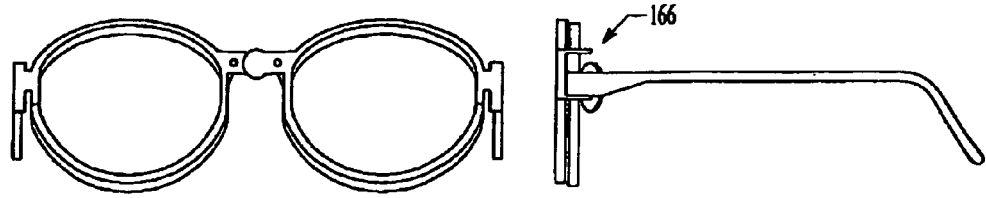
FRONT SET UP
*FIG. 14A*
*FIG. 14D*
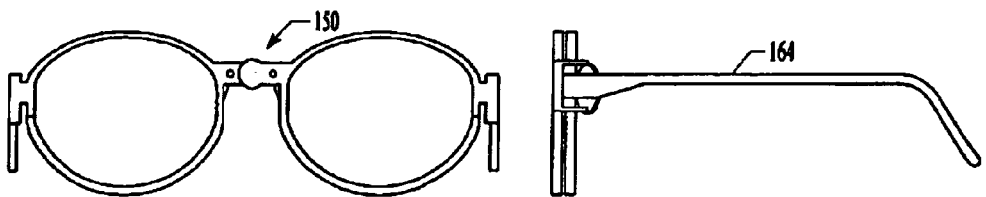
CENTRAL POSITION
*FIG. 14B*
*FIG. 14E*
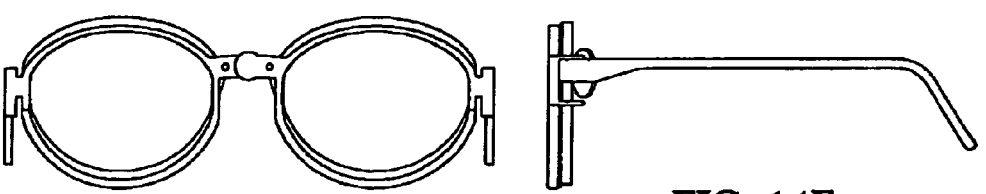
FRONT SET DOWN
*FIG. 14C*
*FIG. 14F*
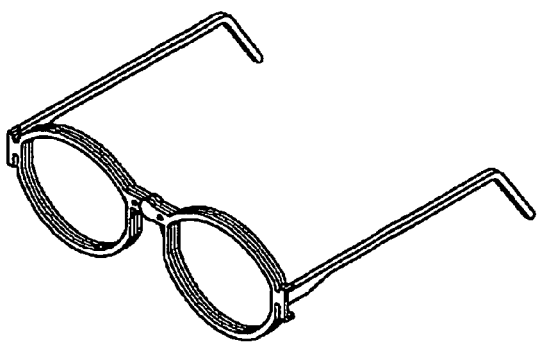
*FIG. 14G*

FRONT LENSES UP

FRONT LENSES DOWN

LOW INVENTORY METHOD OF MAKING EYEGLASSES

CROSS REFERENCE TO RELATED APPLICATIONS

This Application is a continuation in part of U.S. patent application Ser. No. 12/012,743, soon to issue as U.S. Pat. No. 7,943,831 which was a CIP of Ser. No. 11/607,130, filed Feb. 4, 2008, now U.S. Pat. No. 7,325,922, which was a continuation-in-part of Ser. No. 11/085,436 filed Mar. 21, 2005, Ser. No. 11/243,944 filed Oct. 5, 2005, Ser. No. 11/387,023 filed Mar. 21, 2006 and Ser. No. 11/580,398 filed Oct. 14, 2006, each of which are incorporated herein by reference.

FIELD OF INVENTION

This invention relates to eyeglasses, in particular to vision correcting eyeglasses, and to processes for making vision correcting eyeglasses.

BACKGROUND OF THE INVENTION

Nearsightedness and Farsightedness

Nearsightedness is a condition of the eye in which distance objects cannot be focused on the retina and farsightedness is a condition of the eye in which near objects cannot be focused on the retina. These conditions are normally corrected by eyeglasses lenses having a power needed to correct the eye's focus error.

Astigmatism

Astigmatism is a condition of the eye caused by an irregular curvature of an eye surface, usually the front surface. It can be corrected by an eyeglasses lens in which at least one surface has a different curvature in different planes through the lens axis.

Thin Lenses

In ophthalmology and optometry it is customary to specify the focal length of spectacle lenses in diopters. The power P of any lens in diopters D is defined as the reciprocal of the focal length f in meters (i.e. $P=1/f$). For thin lenses, the power P of a two lens ($P_1$ and $P_2$) stacked combination is the sum of the power of the two lenses (i.e., $P=P_1+P_2$). Stacking of two thin lenses 1 and 2 where $P_1=-P_2$ would produce a power of zero, equivalent to a flat plate. The two lenses do not perfectly cancel, but as long as the power is fairly weak (i.e., less than about 5 diopters), the human eye does not detect the residual aberration.

The Human Eye

The adjustable lens of the human eye, called the "crystalline lens", is located immediately behind the iris. The crystalline lens is comprised of 4 layers, from the surface to the center: the capsule, the sub-capsular epithelium, the cortex and the nucleus. The lens capsule is a clear, membrane-like structure that is quite elastic, a quality that keeps it under constant tension. As a result, the lens naturally tends toward a rounder or more globular configuration, a shape it must assume for the eye to focus at a near distance. Slender but very strong suspending ligaments, which attach at one end to the lens capsule and at the other end to protrusions of the circular ciliary body around the inside of the eye, hold the lens in place. When the ciliary body relaxes, the protrusions pull on the suspending ligaments, which in turn pull on the lens capsule around its equator. This causes the entire lens to flatten or to become less convex, enabling the lens to focus light from objects at a far away distance. Likewise when the ciliary muscle contracts, tension is released on the suspending ligaments, and on the lens capsule, causing both lens surfaces to become more convex again and the eye to be able to refocus on near objects. This adjustment in lens shape, to focus at various distances, is referred to as "accommodation". The "amplitude of accommodation" of an eye is the maximum amount that the eye's crystalline lens can accommodate. This amount is very high when young and decreases with age.

The cornea of the human eye is also important in providing focus. In fact, the cornea provides by far the greatest optical power in the eye, with a power of 43.0 D. The entire optical system of the eye has a power of 58.6 D. This causes the light entering the eye to focus onto the retina. The power of the cornea cannot be adjusted, except by surgery.

Presbyopia

After age 40 in most people (and by age 45 in virtually all people) a clear, comfortable focus at a near distance becomes more difficult with eyes that see clearly at a far distance. This normal condition is known as "presbyopia", and is due both to a lessening of flexibility of the crystalline lens and to a generalized weakening of the ciliary muscle. By the time one reaches 65 or so, the crystalline lens is virtually incapable of changing shape. Unless one is nearsighted, it is not possible to focus objects (such as a printed page) clearly at even an arm's length distance. The amount of presbyopia inevitably increases with age. Eyeglasses are usually used to provide correct focus as needed. These eyeglasses include bifocal, trifocal, and continuous focal glasses. Other solutions include separate glasses for distance and reading.

Alvarez and Mukaijama Adjustable Focus Patents

Luis W. Alvarez patented an adjustable focus lens system in 1967 (U.S. Pat. No. 3,305,294) and another in 1970 (U.S. Pat. No. 3,507,565). These patents are incorporated herein by reference. These patents describe lens systems comprised of two complementary lenses. Combining the two lenses produced a lens unit with a focus that could be adjusted by relative motion of the two lenses in an x direction (i.e. linear direction) perpendicular to a viewing direction. These adjustable focus lenses have thickness t described by the equation:

$$t = A(xy^2 + \tfrac{1}{3}x^3) + Bx^2 + Cxy + Dx + E + F(y),$$

or equivalently the by system of relations:

$$\partial^3 t/\partial x^3 = 2A,$$

$$\partial^3 t/\partial x \partial y^2 = 2A, \text{ and}$$

$$\partial^3 t/\partial x^2 \partial y = 0.$$

These equations are hereinafter referred to as the Alverez equations. For this we define the direction away from the face to be the z direction, the translation direction to be the x direction, and the non-translation direction to be the y direction. With this, the lens pair has a variable optical power as we translate them differentially in x. This variable power is a function of the distance that we translate the lenses. The deficiency with the Alvarez equations is that the description is too simple for optimal properties. While the equations are accurate for the region directly in front of the eyes, the glasses are deficient in a number of important optical (especially off-axis image quality) and other quality (such as thickness and weight) and aesthetic parameters.

A patent issued to Mukaiyama and others in 1997 (U.S. Pat. No. 5,644,374) describes essentially the same invention but in a different way. Applicant has determined that the optical performance for designs according to the teachings of this patent to be inadequate. That patent treats the two lenses as if they behave independently, with power and astigmatism effects essentially summing. Applicant has found this assumption to be highly inaccurate, except in the case of lenses that are so weak that they are commercially uninteresting. Also, this patent teaches that the lines of constant power should be parallel and linear, which Applicant has found not to be at all true for an optimized design.

Prior Art Lens Design Techniques

Spherical Surfaces—Focus

Lenses generally consist of curved surfaces. The most basic of these curved surfaces is a sphere. The curve on the surface of a spherical lens, if extrapolated in all directions, would form a ball or perfect sphere. The sphere would vary in size based on the steepness of the curve. A steeper, higher power curve would form a smaller sphere with a smaller radius, while a flatter, lower power curve would form a larger sphere with a larger radius.

In addition to being described by their power or radius, spherical curves also have a direction. An inward curve is called concave, while an outward curve is called convex. A minus lens that diverges light would require a concave spherical surface, while a plus lens that converges light would require a convex surface. Therefore, we use the minus (−) sign to denote concave curves, the plus (+) sign to denote convex curves, and the term "plano" to describe a flat or zero curve.

A prior art eyeglasses lens has two curved surfaces of consequence to the vision of the wearer: the front surface and the back surface. Common lens shapes based on front and back curves are described in the FIG. 21. The corrective power of a lens is determined by adding the front curve to the back curve. This is expressed by the equation: $F_1+F_2=F_{Total}$. For any given corrective power, an infinite number of curve combinations may be used to achieve the same result.

Example:

+6.00 D+−2.00 D=+4.00 D

+4.00 D+0.00 D (plano)=+4.00 D

+2.00 D++2.00 D=+4.00 D

Eyeglass fabricators typically have a limited number of curve combinations with which to work. Lens blanks come from manufacturers with a limited selection of front curves, also known as base curves, with suggested power ranges for each. Furthermore, since aberrations occur as the eye moves away from the optical center of the lens, the lab will choose curves that minimize aberrations. Lenses with curves chosen to minimize aberrations are called "corrected curve" or "best form" lenses.

The following chart shows some basic guidelines for selecting base curves to minimize peripheral aberrations.

| Correction Range (Diopters) | Power of Front Surface |
|---|---|
| >+12.25 | +16.00 D |
| +10.75 to +12.25 | +14.00 D |
| +9.00 to +10.50 | +12.00 D |
| +5.50 to +8.75 | +10.00 D |
| +2.25 to +5.25 | +8.00 D |
| −1.75 to +2.00 | +6.00 D |
| −2.00 to −4.50 | +4.00 D |
| −4.75 to −8.00 | +2.00 D |
| −8.00 to −9.00 | +0.50 D |
| <−9.00 | plano or minus |

These are guidelines for selecting base curves, there may be many more factors involved in base curve selection including: manufacturer recommendations, frame selection, aesthetics, lens material, and patient history.

Cylindrical Surfaces—Astigmatism

In addition to the spherical curve, many prescriptions call for a cylinder curve to correct for astigmatism. A cylinder curve is curved along a single axis and flat along the perpendicular axis. Furthermore, while the focus of a spherical curve is a single point, the focus of a cylinder curve is a line. The meridian along which there is no cylinder power in the lens and consequently the meridian of the cylindrical focus is the cylinder axis. The cylinder axis is expressed in degrees between 0 and 180.

Most prescriptions have some combination of spherical and cylinder curves. A lens that combines spherical and cylinder curves is called a compound lens or toric. The convention of the "power cross" helps conceptualize the compound lens. The power cross is a representation of the two major meridians of the lens surface. FIGS. 19 and 20 show examples where the power in the meridian of the cylinder axis is plano, while the power of the meridian perpendicular to the cylinder axis is +4.00 D.

FIG. 19 shows the +4.00 D cylinder curve at 45°. Note, the curves at the 90° and 180° are now +2.00 D and the +4.00 D curve is now at 135°. As the meridian is rotated away from the cylinder axis, the curve gradually changes from 0 to the full power of the cylinder curve (+4.00 D in this example) once the meridian is perpendicular to the cylinder axis.

Since a spherical curve is the same in all meridians, if a −2.00 D spherical curve is combined with a +4.00 D cylinder at 45°, we end up with a compound lens described by the power cross shown in FIG. 20.

Prior Art Inventory Requirements

The number of lens shapes required to correct a certain population is statistical in nature, but a reasonable set which would cover a large fraction of people would consist of every power (or focus) value from −6 D to +4 D, and every amount and direction of astigmatism from −2 D to +2 D. The focus steps could be 0.25 D, and the astigmatism steps 0.5 D. Rather than describing astigmatism as a magnitude and direction, an equivalent description of astigmatism is two components each with signed magnitudes. These components can be described by zero degrees astigmatism and 45 degrees astigmatism. In this description, for as example provided in the detailed description, each component would vary from −2 D to +2 D in steps of 0.5 D. If the lenses are inventoried as round blanks, then the lens can be rotated before cutting to the shape of the frame ("edging"). In this case there would need to be (41 power values)×(9 astigmatism values)=369 parts. This requires a somewhat expensive piece of equipment at the point of sale to perform the edging, however. If the lenses are pre-edged in a central factory, then we would need 9 values of 0° astigmatism and 9 values of 45° astigmatism (in addition to the 41 power values), for a total of 3321 parts. This is usually considered impractical, so most outlets will perform on-site edging.

What is needed is a way to reduce the number of these parts so that more of the lens finishing can be done at the central factory and less at the point of sale.

SUMMARY OF THE INVENTION

The present invention provides a very low inventory method of making eyeglasses. Two lens elements having special complementary surfaces are provided. These lens elements can be positioned relative to each other to provide wide ranges of focus correction and astigmatism correction. Various preferred embodiments of the invention are described. In one embodiment the required inventory is only identical sets of two complementary lenses for providing correction for almost all needed eye correction for a typical population. In this embodiment, the lens units are first adjusted relative to each other to provide a desired focusing power. Astigmatism may be corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

In other embodiments one of the lenses is prefixed in eyeglass frames and the other lens is positioned at the point of sale to provide focus and astigmatism correction. In this embodiment several sets of lenses are needed in inventory, but the needed inventory is a small fraction of the inventory requirement of typical prior art laboratories for making eyeglasses.

In another embodiment one of the lenses is pre-edged but not mounted in the frame and the other lens is positioned at the point of sale to provide focus and astigmatism correction. In this embodiment again several sets of lenses are needed in inventory, but the needed inventory is a small fraction of the inventory requirement of typical prior art laboratories for making eyeglasses.

In a preferred set of embodiments the first of the two lenses is comprised of rigid material having a special surface. This first lens is pre-edged and mounted in a frame and a second lens comprised of a flexible material adapted to adhere to the first lens by tactile interactions and having a special surface complementary to the surface of the first lens. The second lens is positioned on the first lens to provide focus and or astigmatism correction.

Preferred General Equations for Thickness Profiles

In preferred embodiments Applicant uses coordinates $(u,v)$ in a plane perpendicular to the viewing direction when looking straight ahead ("on-axis"). He calls this plane the "plane of the lens". The origin point $(u,v)=(0,0)$ is defined to be the point directly in front of the pupil when looking straight ahead. This is convenient because users in general desire better performance when the eye is looking on-axis compared to looking at an angle ("off-axis"). The u-coordinate points in the direction of relative motion of the lenses when in the null position. The v-coordinate direction is orthogonal to the u-coordinate direction, but in the plane of the lens.

The motion of the lens can either be purely in the u-direction, or rotate around an axis located at $(u,v)=(0,-r_0)$. Applicant uses a parameter $\alpha$ which is 0 in the case of translational motion, and $1/r_0$ in the case of rotation around an axis.

The basic general equations defining the thickness profiles are given by:

$$((\alpha v+1)^{-2}\partial^3 t/\partial u^3 + \alpha(\alpha v+1)^{-1}\partial^2 t/\partial v\partial u)|_{(u,v)=(0,0)} = 2A$$

$$(\alpha^3 t/\partial v^2\partial u)|_{(u,v)=(0,0)} = 2A$$

$$((\alpha v+1)^{-1}\partial^3 t/\partial v\partial u^2 - \alpha(\alpha v+1)^{-2}\partial^2 t/\partial u^2)|_{(u,v)=(0,0)} = 0.$$

The notation "$(u,v)=(0,0)$" indicates that the relations only hold for the center point $(u,v)=(0,0)$, but not necessarily outside of that point. However, Applicant requires the thickness profile functions to be continuous, and the derivatives up to at least third order to be continuous. Applicant picks A for one lens to be the complement (negative value) of A for the other lens.

The solutions to these equations are:

$$t = A[uv^2 + 2(\alpha v+1)(\alpha u - \sin(\alpha u))/\alpha^3] + B[2(\alpha v+1)(1-\cos(\alpha u))/\alpha^2)] + C[v\sin(\alpha u)/\alpha - (\alpha u - \sin(\alpha u))/\alpha^2] + Du + E + F(v) + F1(u,v)u^4 + F2(v)u^3v + F3(v)u^2v^2 + F4(v)uv^3,$$

where
$F(v)$, $F1(u,v)$, $F2(v)$, $F3(v)$, $F4(v)$
are any functions over the area of the lenses for which derivatives up to at least third order are continuous.

Translation Only Designs:

In the case of translation only designs, $\alpha=0$. Applicant has defined $x=u$, and $y=v$. He defines the origin $x=0$, $y=0$ to be the point directly in front of the pupil when looking straight ahead. The equations in this form for the translation designs are:

$$(\partial^3 t/\partial x^3)|_{(x,y)=(0,0)} = 2A,$$

$$(\partial^3 t/\partial x\partial y^2)|_{(x,y)=(0,0)} = 2A, \text{ and}$$

$$(\partial^3 t/\partial x^2\partial y)|_{(x,y)=(0,0)} = 0.$$

Note that the Alvarez description referred to in the Background Section is the same at the center $(x,y)=(0,0)$, but Alvarez also applies this restriction away from the center point whereas the present invention considers a wide variety of parameters to optimize the design across the entire lens profile. As above Applicant picks A for one lens to be the complement of A for the other lens.

The solution is found by taking the limit as $\alpha \to 0$ in the above thickness expression, which results in $$t = A(xy^2 + \frac{1}{3}x^3) + Bx^2 + Cxy + Dx + E + F(y) + F1(x,y)x^4 + F2(y)x^3y + F3(y)x^2y^2 + F4(y)xy^3.$$

This can be seen as identical to the Alvarez except for the addition of F1, F2, F3 and F4. These additional functions will be shown in this patent to be important for optimized performance.

Designs Including Rotation:

The relative motion perpendicular to the viewing direction may also include rotation in the plane of the lens. In this case, at least one of the lenses pivots about a pivot location. For a good solution to exist, this must be outside of the lens perimeter.

For the pivot design, we will call $r_0\theta = u$, and $r-r_0 = v$, with $r_0 = 1/\alpha$. The origin $r=0$ is the pivot point, and $r=r_0$, $\theta=0$ is the point directly in front of the pupil when looking straight ahead. In this form, the equations are given by $$r_0^{-1}(r^{-2}\partial^3 t/\partial\theta^3 + r^{-1}\partial t/\partial r\partial\theta)|_{(r,\theta)=(r_0,0)} = 2A$$

$$r_0^{-1}(\partial^3 t/\partial r^2\partial\theta)|_{(r,\theta)=(r_0,0)} = 2A$$

$$r_0^{-1}(r^{-1}\partial^3 t/\partial r\partial\theta^2 - r^{-2}\partial^2 t/\partial\theta^2)|_{(r,\theta)=(r_0,0)} = 0.$$

The solution in this form is $t=Ar_0[(r^2+r_0^2)\theta-2rr_0\sin(\theta)]+B2r_0r(1-\cos(\theta))+Cr_0[r\sin(\theta)-r_0\theta]+Dr_0\theta+E+F(r)+F1(r,\theta)r_0^4\theta^4+F2(r)r_0^3(r-r_0)\theta^3+F3(r)r_0^2(r-r_0)^2\theta^2+F4(r)r_0(r-r_0)^3\theta$, The terms have been defined so that the constants are the same as in the general equation, but a shorter equivalent form provided below is possible by redefining the constants:

$t=A'r^2\theta+B'r\cos(\theta)+C'r\sin(\theta)+D'\theta+E'+F'(r)+F1'(r,\theta)\theta^4+F2'(r)(r-r_0)\theta^3+F3'(r)(r-r_0)^2\theta^2+F4'(r)(r-r_0)^3\theta$.

Choosing Parameters

The choice of parameters to the general solutions depends on desired optical performance, other restrictions such as minimum and maximum thickness and aesthetic and other considerations. These specific optimum solutions use a form much more general than that described by Alvarez. Applicant picks the parameters and functions to optimize lens properties. In preferred embodiments 17 specific parameters and functions are optimized to provide desired performance and other quality and aesthetic results.

BRIEF DESCRIPTION OF THE DRAWINGS

FIGS. 2A, 2B and 2C and 3A, 3B and 3C show results achieved with the present invention.

FIGS. 9A through 9I show features of a second frame design for vertical lens motion.

FIGS. 10A through 10E show features of a third frame design for vertical lens motion.

FIGS. 14A through 14G show features of a second frame design for pivotal lens motion.

DETAILED DESCRIPTION OF PREFERRED EMBODIMENTS

Theory

Figure 1A:
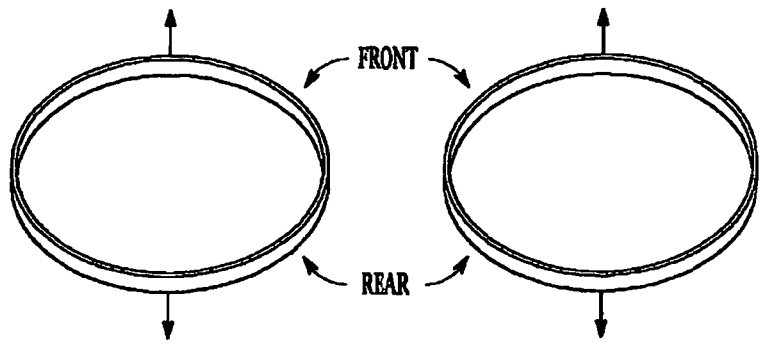
FIGS. 1A, 1B and 1C show relative movement of two lens elements in the vertical, horizontal and pivot directions.

In preferred embodiments of the present invention focus and astigmatism are corrected by adjusting the position of one of the two lens elements (in each of the two lens units) relative to the other lens element in directions generally perpendicular to a viewing direction. In a preferred set of embodiments the relative motion is linear in a single direction and in another set of embodiments the relative motion is pivotable about a pivot location outside the lenses. Examples of this relative motion are shown in FIG. 1A (vertical motion), FIG. 1B (horizontal motion) and FIG. 1C (pivotal motion). In these examples the first lens element has a specially designed thickness profile defining a first thickness profile and the second lens element has a thickness profile defining a second thickness. The thickness profiles are designed such that small adjustments of the relative positions of the two lenses in directions perpendicular or approximately perpendicular to a viewing direction results in changes in the combined focus of the two lenses of the lens units.

General Equations for Thickness Profiles

Applicant uses coordinates (u,v) defined in the plane of the lens. The origin point $(u,v)=(0,0)$ is defined to be the point directly in front of the pupil when looking on-axis. This is convenient because users in general desire better performance when the eye is looking nearer to straight ahead. The u-coordinate points in the direction of relative motion of the lenses when in the null position. The v-coordinate direction is orthogonal to the u-coordinate direction, but in the plane of the lens.

The motion of the lens can either be purely in the u-direction, or rotate around an axis located at $(u,v)=(0,-r_0)$. We will use a parameter $\alpha$ which is 0 in the case of translational motion, and $1/r_0$ in the case of rotation around an axis.

The basic general equations defining the thickness profiles are given by:

$$((\alpha v+1)^{-2}\partial^3 t/\partial u^3 + \alpha(\alpha v+1)^{-1}\partial^2 t/\partial v\partial u)|_{(u,v)=(0,0)}=2A$$

$$(\alpha^3 t/\partial v^2\partial u)|_{(u,v)=(0,0)}=2A$$

$$((\alpha v+1)^{-1}\partial^3 t/\partial v\partial u^2 - \alpha(\alpha v+1)^{-2}\partial^2 t/\partial u^2)|_{(u,v)=(0,0)}=0.$$

The notation "$(u,v)=(0,0)$" indicates that the relations only hold for the center point $(u,v)=(0,0)$, but not necessarily outside of that point. However, Applicant requires the thickness profile functions to be continuous, and the derivatives up to at least third order to be continuous. He picks A for one lens element to be the complement of the other lens element.

The solutions to these equations are:

$t=A[uv^2+2(\alpha v+1)(\alpha u-\sin(\alpha u))/\alpha^3]+B[2(\alpha v+1)(1-\cos(\alpha u))/\alpha^2)]+C[v\sin(\alpha u)/\alpha-(\alpha u-\sin(\alpha u))/\alpha^2)]+Du+E+F(v)+F1(u,v)u^4+F2(v)u^3v+F3(v)u^2v^2+F4(v)uv^3$, where
F(v), F1(u,v), F2(v), F3(v) and F4(v)
are any functions over the area of the lenses for which derivatives up to at least third order are continuous.
Translation Only Designs:

In this case $\alpha=0$. Applicant defines x=u, and y=v. He defines the origin x=0, y=0 to be the point directly in front of the pupil when looking straight ahead. The equations in this form are:

$$(\partial^3 t/\partial x^3)|_{(x,y)=(0,0)}=2A$$

$$(\partial^3 t/\partial x\partial y^2)|_{(x,y)=(0,0)}=2A$$

$$(\partial^3 t/\partial x^2\partial y)|_{(x,y)=(0,0)}=0.$$

Note that the Alvarez description is essentially the same at the center (x,y)=(0,0), but is too restrictive away from the center point. Applicant picks A for one lens to be the complement of the other lens.

The solution in found by taking the limit as α→0 in the above thickness expression, which results in $$t = A(xy^2 + \tfrac{1}{3}x^3) + Bx^2 + Cxy + Dx + E + F(y) + F1(x,y)x^4 + F2(y)x^3y + F3(y)x^2y^2 + F4(y)xy^3.$$

This can be seen as identical to the Alvarez except for the addition of F1, F2, F3 and F4. These additional functions will be shown in this patent to be important for optimized performance.

Designs Including Rotation:

The motion we consider may also include rotation in the x-y plane. In this case at least one of the lenses pivots about a pivot location. For a good solution to exist, this must be outside of the lens perimeter.

For the pivot design, we will call $r_0\theta = u$, and $r - r_0 = v$, with $r_0 = 1/\alpha$. The origin $r = 0$ is the pivot point, and $r = r_0$, $\theta = 0$ is the point directly in front of the pupil when looking straight ahead. In this form, the equations are given by $$r_0^{-1}(r^{-2}\partial^3 t/\partial\theta^3 + r^{-1}\partial t/\partial r\partial\theta)|_{(r,\theta)=(r_0,0)} = 2A$$

$$r_0^{-1}(\partial^3 t/\partial r^2\partial\theta)|_{(r,\theta)=(r_0,0)} = 2A$$

$$r_0^{-1}(r^{-1}\partial^3 t/\partial r\partial\theta^2 - r^{-2}\partial^2 t/\partial\theta^2)|_{(r,\theta)=(r_0,0)} = 0.$$

The solution in this form is $$t = Ar_0[(r^2 + r_0^2)\theta - 2rr_0\sin(\theta)] + B2r_0r(1-\cos(\theta)) + Cr_0[r\sin(\theta) - r_0\theta] + Dr_0\theta + E + F(r) + F1(r,\theta)r_0^4\theta^4 + F2(r)r_0^3(r-r_0)\theta^3 + F3(r)r_0^2(r-r_0)^2\theta^2 + F4(r)r_0(r-r_0)^3\theta,$$

The terms have been defined so that the constants are the same as in the general equation, but a shorter equivalent form is possible by redefining the constants:

$$t = A'r^2\theta + B'r\cos(\theta) + C'r\sin(\theta) + D'\theta + E' + F'(r) + F1'(r,\theta)\theta^4 + F2'(r)(r-r_0)\theta^3 + F3'(r)(r-r_0)^2\theta^2 + F4'(r)(r-r_0)^3\theta.$$

Choosing Parameters

The choice of parameters to the general solutions depends on desired optical performance, other restrictions such as minimum and maximum thickness and aesthetic and other considerations. These specific optimum solutions use a form much more general than that described by Alvarez. Applicant picks the parameters and functions to optimize lens properties. In preferred embodiments 17 specific parameters and functions are optimized to provide desired performance and other quality and aesthetic results. These parameters are picked based factors that may include:

The variable optical power is adequate:
 1. The on-axis optical power at the various settings (translation distances) should meet the design constraints.
 2. The off-axis optical power at the various settings may be allowed to deviate within certain limits. The amount of deviation will typically be allowed to increase as the direction becomes more off-axis.

The optical performance at all power settings is adequate. This corresponds to the level of residual aberration at best focus:
 3. The performance should be particularly good on-axis.
 4. The off-axis performance may be allowed to degrade within certain limits. The amount of degradation will typically be allowed to increase as the direction becomes more off-axis.
 5. The motion for a given optical power should be minimized. This is equivalent to maximizing the magnitude of the A parameter.
 6. There will be a minimum lens thickness required for manufacturability and safety.
 7. The total weight of the lens should be minimized.
 8. The shape of the front surface most away from the eye meets certain aesthetic constraints such as a general convex shape.
 9. The inner surface closest to the eye is adequately separated from the eye. The outer surface may also be constrained to be within a certain distance of the eye for aesthetic reasons.
 10. The "average" wedge, which causes a lateral shift in the image location and possibly chromatic aberration, may be constrained to be within a certain limit.
 11. The variable wedge, which causes a lateral shift in the image location as the power is adjusted, may be constrained to be within a certain limit
 12. The wedge, both static and variable, may be matched for the lens pairs in front of each eye.
 13. The design should be reasonably insensitive to the exact eye location relative to the lens within certain limits. This is to accommodate different face shapes.
 14. The design may contain a prescription base correction. This base correction should be preserved as the lenses are translated into their power settings.
 15. There may be a surface that is manufactured to a stock shape, with other surfaces allowed to be designed differently for various designs. This is in order to reduce manufacturing costs.

The thickness of the lens element in the above discussion is considered to be the difference in the front surface and rear surface lens z-location defined as a function of x,y (or u,v or r,θ). Due to bowing or tilting of the lens, there will be a slight difference between this thickness and thickness alternatively defined as minimum surface separation. It is more conventional in manufacturing to use the z-location definition. While it is important to have the definition clear for manufacturing, the effect on the constraints is usually very minor. This is because specifically for eyeglasses, the lenses are close enough to planar so that minimum thickness is close for the two definitions.

In addition to thickness, which is the difference between the surfaces, the lens design also requires the average of the two surfaces to be specified, which can be called the shape. Applicant places no restrictions on the functional form of the shape, other than the above constraints, and limits to the degree of approximation (for computational purposes). In preferred embodiments actually tested with optical software the constraints were applied with results that are discussed later.

Balancing Design Constraints

All of these design constraints cannot simultaneously be individually optimized; instead, some balance needs to be chosen by the designer. This can be accomplished algorithmically by combining constraints, for parameters which must be met; and a merit function to be minimized, which contains a functional combination of parameters and creates an optimal balance based on the weighting of the parameters in the merit function.

Adequate Optical Performance

Adequate optical performance is both a design and a manufacturing consideration. For the case of design, most common is to use the well-known technique of ray tracing to evaluate performance. Other techniques include wave optics simulations.

Adequate optical design performance divides into categories:

1. Optical power at the various settings, on-axis: usually selected by the designer. This is the amount of focus, usually expressed in diopters, of the rays entering the eye's pupil.
2. Optical power off-axis: this value should match the on-axis power setting to a degree, but may be allowed to deviate in order to optimize other lens parameters
3. Residual best-focus aberration, no prescription: minimized. This is the residual ray angular deviation which remains after focus is removed. The residual aberration will usually be most constrained on-axis, and allowed to increase as the eye is pointed increasingly off-axis. This can be expressed in terms of peak aberration, or in terms of some weighted sum such as rms aberration.
4. The residual best-focus aberration may be designed for a prescription correction. In this case the residual will be residual ray angular deviation which remains after focus and prescription are removed. Usually the prescription correction includes focus and 2 directions of astigmatism, but may include higher order terms.

Preferred Technique for Optimization

Applicant presents here a preferred technique for optimizing the lens units. It should be noted that the numerical techniques involved are standard, and can be implemented in various ways. Elements of the present invention include the application of the desired constraints and merit functions to the mathematics of lens design, and the more general variable thickness profile formulas which allow superior optimization.

Optimization with a Prescription Function:

A design with prescription correction can be optimized using the same procedure described above. The only difference is subtraction of the ray directions associated with the desired base prescription before finding the best focus residual aberration.

Optimization with a Pivot Design:

A pivot design is optimized using the same procedure described above for translating lenses. The only difference is 1) the lens thickness parameters use the formula described above for the pivot design, and 2) the ray trace calculations and spacing calculations are performed on the lenses with the pivot motion rather than translation motion.

Comparison with Prior Art designs:

Applicant prepared a prior art design for comparison purposes. This design used the more restrictive thickness equations described in Alvarez, but with polynomial terms up to $5^{th}$ order considered for the common shape of the front and back surfaces. This allowed complex shapes but with the simpler Alvarez thickness formula. Applicant achieved:

1. average thickness 2.22 mm,
2. single-wavelength ray aberration diameter<1.20 mrad at all 0.5 radian off-axis look angles, and
3. single-wavelength ray aberration diameter<0.40 mrad at all 0.25 radian off-axis look angles.

Figures 4A, 4B, 4C:
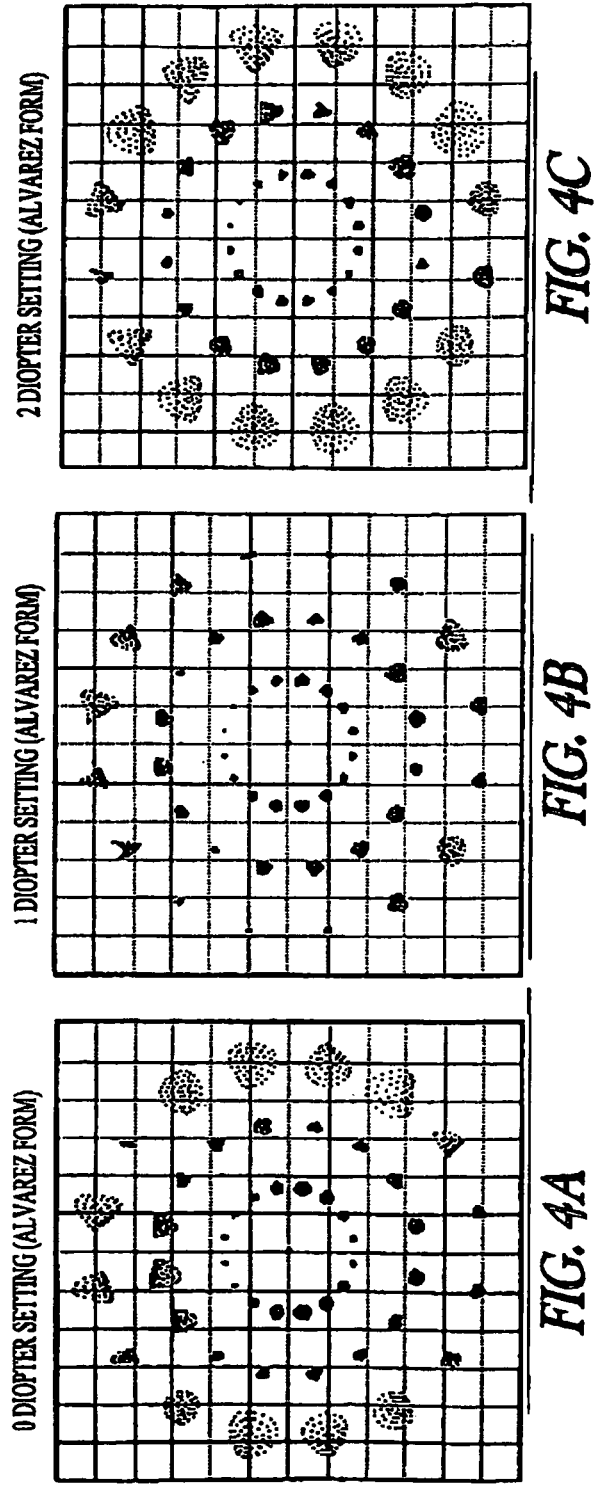
FIGS. 4A, 4B and 4C show comparison results achieved with a prior art technique.

The results are shown in FIGS. 4A, 4B, 4C. Despite being significantly thicker and therefore more massive, the design has worse optical performance due to the restrictions on the thickness.

Optimized Design Matching Prior Art Thickness

This design used the general thickness equations described in this patent. Polynomial terms up to $5^{th}$ order were considered for the surfaces. The merit function was adjusted so that the average thickness matched the prior art design. We achieved:

1. average thickness 2.22 mm,
2. single-wavelength ray aberration diameter <0.42 mrad at all 0.5 radian off-axis look angles, and
3. single-wavelength ray aberration diameter <0.14 mrad at all 0.25 radian off-axis look angles.

Optimized Design Matching Prior Art Aberration:

This design used the general thickness equations described in this patent. Polynomial terms up to $5^{th}$ order were considered for the surfaces. The merit function was adjusted so that the residual aberrations matched the prior art design. Applicant achieved:

1. average thickness 1.88 mm,
2. single-wavelength ray aberration diameter <1.20 mrad at all 0.5 radian off-axis look angles, and
3. single-wavelength ray aberration diameter <0.40 mrad at all 0.25 radian off-axis look angles.

Summary: Alvarez and Mukaiyama Vs Present Invention

Alvarez

The performance comparison of a lens unit designed according to the present invention versus an Alvarez designed lens unit is summarized in the following table:

|  | Average Thickness | Aberration (At 0.5 Radians) | Aberration (At 0.25 Radians) |
| --- | --- | --- | --- |
| Prior Art (Alvarez) | 2.22 | 1.20 | 0.40 |
| Present Invention (Nominal) | 2.00 | 0.84 | 0.28 |
| Present Invention (Low Aberration) | 2.22 | 0.42 | 0.14 |
| Present Invention (Low Weight) | 1.88 | 1.20 | 0.40 |

It is clear that the equations described by Alvarez are significantly inferior to the equations described in this patent.

Mukaiyama

Figures 5A, 5B:
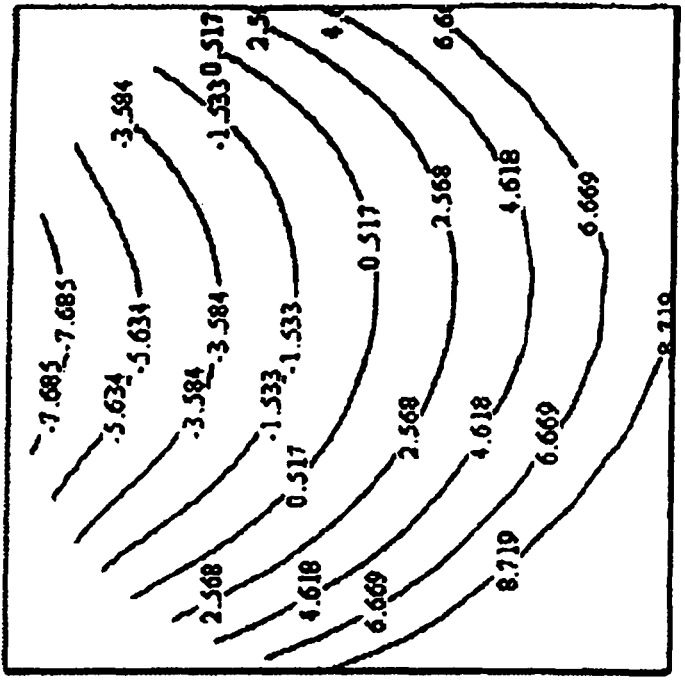
FIGS. 5A and 5B and 6A and 6B show features of another prior art technique.

The Mukaiyama patent (1997) treats the two lenses as if they behave independently, with power and astigmatism effects essentially summing. Applicant found this assumption to be highly inaccurate. To show this, he first plotted the power diagrams for the back and front lens separately. See FIGS. 5A and 5B. Notice that the lines of constant power are not even close to linear, in contrast to a key requirement of the Mukaiyama patent.

Figure 6B:
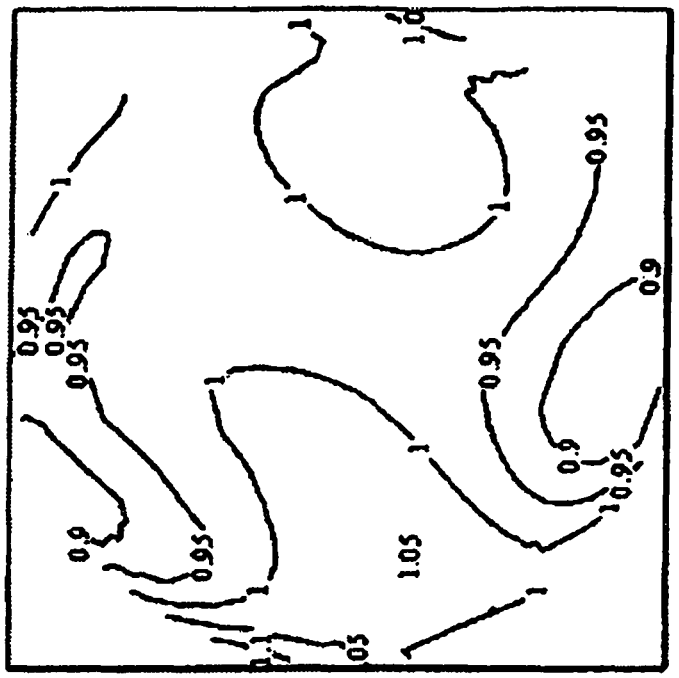
Figure 6A:
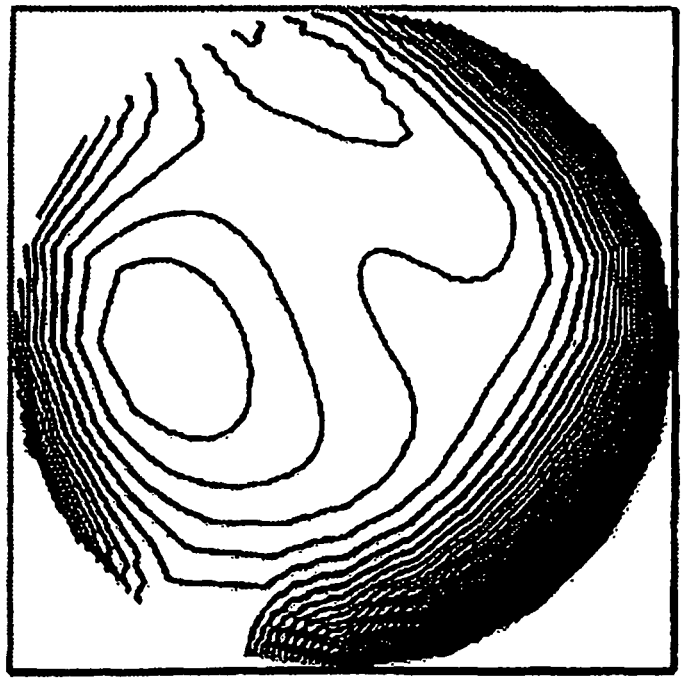

Also, the Mukaiyama patent makes an implicit assumption that these values simply add together when the lenses are placed in tandem. Here he shows that assumption to be false. See FIGS. 6A and 6B. The first plot is the sum of the above two power diagrams, with contour lines separated by 0.05 diopters (the numbers were left off for visibility). The second plot is the actual power diagram for the system. Notice that the two diagrams do not agree, which shows that it is necessary to consider the lenses as a unit when performing the optimized design.

Zemax Optimization

ZEMAX optical design software was also used to perform the optimization of the shape of the polynomial surfaces after the thickness profiles had been calculated as described above. The optimization feature in ZEMAX uses an actively damped least squares method and a merit function that allows for constraints on most optical and physical properties of a lens. A root mean square (RMS) spot radius 'Default Merit Function' was used with the additional constraint on the minimum lens thickness of 1.0 mm. Due to the non-rotationally symmetric nature of these lenses, multiple operands were required to constrain the lens thickness at several radial zones within the lens. The nominal polynomial function that provides a desired change in optical focusing power with lateral translation tends to have thickness minima in the outer half of the lens, so the constraint on the minimum thickness was defined at zones of 60%, 70%, 80%, 90% and 100% of the lens diameter.

A total of 27 configurations were created in a ZEMAX file to model the lens at 9 different eye gaze angles for 3 different lens translational positions (0 D, +1 D, +2 D). The merit function was weighted over these 27 positions such that the performance was appropriately better at the central gaze angles. Specifically, the on-axis gaze angle was weighted at 20, the next 4 closest gaze angles were weighted at 2 and the 4 peripheral gaze angles were weighted at 1.

The thickness of the polynomial surface is defined by a 5$^{th}$ order polynomial function in x and y. The form of the polynomial function is:

$$T(x,y)=a_1x+a_2x^3+a_3xy^2+a_4y^4+a_5x^2y^2+a_6y^4+a_7x^5+a_8x^3y^2+a_9xy^4.$$

In addition to slight eye focus for the off-axis gaze angles, the following polynomial coefficients were free to vary during optimization: $a_1$, $a_2$, $a_3$, $a_4$, $a_5$, $a_6$, $a_7$, $a_8$, $a_9$.

The ratio of $a_2$ to $a_3$ was fixed to match the functional form defined above for the thickness. Only even-powered y terms were used because for this particular case the lens and view angles were taken to be symmetric in y. This simplified the problem by introducing symmetry. The second order terms were omitted, because the lens surface radii of curvature were selected as an alternative to use of $x^2$ and $y^2$ terms.

Figure 17:
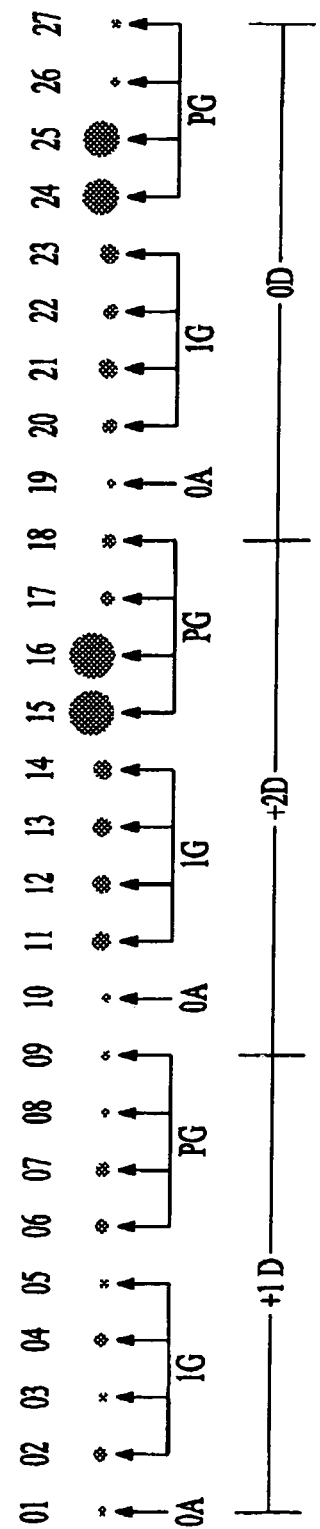
FIG. 17 show results of a ZEMAX optimization.

FIG. 17 is the resulting spot diagrams for the 27 configurations. The configurations correspond to the following lens positions and gaze angles:
Configurations 01-09=+1 D
Configurations 10-18=+2 D
Configurations 19-27=0 D
On-Axis (OA) Gaze Angles=Configurations 1, 10, 19
Intermediate Gaze (IG) Angles=Configurations 2-5, 11-14, 20-23
Peripheral Gaze (PG) Angles=Configurations 6-9, 15-11, 24-27
Alvarez Concept Adapted for Spherical Coordinates:

In this preferred embodiment, we modify the Alvarez design concepts, which are based on primarily planar lenses with planar motion. This new approach utilizes spherical lenses with spherical motion. This new spherical design applies to primarily spherical meniscus shaped lenses with primary motion lateral but along that spherical shell.

The surfaces used are similar to but slightly different from the Alvarez formulas. The Alvarez formulas apply to variable power lenses with lateral motion. This new approach utilizes a variant which allows curved surfaces with curved motion, which are more appropriate for eyeglass lenses.

The Alvarez teaching, as a comparison, uses surfaces of the form $$A(y^3/3+x^2y)+By+C$$

for constants A, B, C. The thicknesses of a pair of complementary lenses sharing this surface are $$A(y^3/3+x^2y)+By+C1 \text{ and } -A(y^3/3+x^2y)+-By+C2.$$

When these lenses are translated in the y-direction with respect to each other, then the sum of the thicknesses becomes $$A((y+\Delta y)^3/3+x^2(y+\Delta y))+B(y+\Delta y)+C1+-A((y+\Delta y)^3/3+x^2(y+\Delta y))+-B(y+\Delta y)+C2=2A\Delta y(x^2+y^2)+2A(\Delta y)^3/3+2B\Delta y+C1+C2.$$

This net thickness describes a powered lens, with power proportional to motion. When we translate in the x-direction, we likewise produce a net thickness which describes an astigmatic lens.

We use for this new design a similar treatment except that we use spherical coordinates. Our surface, expressed as radial distance r in terms of spherical angles $\theta$ and $\phi$, has the form $$r=AR(\sin(\phi)\cos(\theta)-\phi \cos(\theta_0))+R$$

where R is the base radius of the surface, and A and $\theta_0$ are constants. We use the convention that $\theta$ is measured from the equator. The net thickness of a pair of translated lenses as a function of the angles $\theta$ and $\phi$ with relative translation in the $\phi$ direction is $$AR(\sin(\phi+\Delta\phi)\cos(\theta)-(\phi+\Delta\phi)\cos(\theta_0))-R1+-AR(\sin(\phi-\Delta\phi)\cos(\theta)-(\phi-\Delta\phi)\cos(\theta_0))+R2=2AR(\cos(\phi)\cos(\theta)\sin(\Delta\phi)-\Delta\phi\cos(\theta_0))-R1+R2$$

Where R1 is the radius of the spherical inner lens inner surface and R2 is the radius of the spherical outer lens outer surface. If we consider the thickness as a function of Cartesian coordinates defined on the nominal sphere radius, we see that the thickness can be rewritten as $$z=R \sin(\theta) \text{ and } x=R \cos(\theta)\sin(\phi) \text{ gives}$$

$$\text{thickness}=2A \sin(\Delta\phi)\text{sqrt}(R2-z2-x^2)-2AR\Delta\phi \cos(\theta_0)-R1+R2$$

Written in this form, the thickness can be seen to describe an ellipsoid, which produces power with no astigmatic component.

Also notice the $\theta_0$ parameter in the above surface descriptions affects the minimum lens thickness, but not the power, so can be set differently for the two lenses to optimize thickness and weight.

We must also use a standard mathematical routine to convert the spherical description of the surface into a Cartesian array of points for manufacturing. This is done with a search routine that finds $\theta$ and $\phi$ given the lateral position in the grid, then finds the r surface value using the above formula, and then transforms back to Cartesian coordinates to compute the depth value.

Index of Refraction Matching:
When the inner and outer lenses are made from different materials, the relationship of the index of refraction of the lenses is important.
1. In the case where the indices of refraction of the soft and hard lens are similar enough so that the index mismatch errors are tolerable, and the above description applies.
2. If the soft and hard lenses have index of refraction different enough to cause index mismatch errors, then the surface must be made stronger for the lens with a lower index. In this case the constant A in the surface description $r=AR(\sin(\phi)\cos(\theta)-\phi \cos(\theta_0))+R$ must be different for each lens, specifically set proportional to $1/(n-1)$. The flexibility of the soft lens will allow the surfaces to still contact.

Tension on the Flexible Lens:
When the soft lens is attached to the hard lens, depending on positioning, there will be a bending of the soft lens. This bending may be in a direction which pulls in the center and pushes at the edges, like a suction cup ("Suction Cup Bending"), or may push at the center and pull at the edges ("Anti- Suction Cup Bending"), or may push at some points on the edge and pull on others ("Potato Chip Bending"). The soft lens can, however, be designed with a controlled offset radius so that one of these bending forms will occur for all attachment orientations:

1. Minimum Bending Design—In this case the surfaces use the same base radius R so that the lens pair matches in the null position. The average bending in this case is minimized. Motion which removes power or adds negative power causes Suction Cup Bending, a void in the center which is pressed out using the flexibility of the soft lens. Motion which adds power or removes negative power causes Anti-Suction Cup Bending, a void at the edges which must be pushed into contact and affixed. In general Anti-Suction Cup Bending is more difficult to work with. Motion which adds astigmatism can cause Potato Chip Bending.
2. Suction Cup Only Design—In this case we intentionally use a larger base radius for the rear design and smaller for the front design, so that the lens pair forms a Suction Cup Bending type of arrangement when pressed together for any relative positioning of the lenses.

To add a base power we change the outer spherical surfaces of one of the two lenses. Preferably this would be the hard lens, because the hard lens does not bend and so the attachment issues would not be affected.

Using the Present Invention to Make Fixed-Lens Eyeglasses

The techniques described in this application can be applied to greatly reduce the cost of providing eyeglasses. These techniques reduce needed inventory stocks of lenses to meet patient's needs for focus and astigmatism correction. These techniques are described below:

In preferred embodiments sets of lenses are prepared as described in parent application Ser. No. 11/607,130, except the lenses are set during a second stage of a manufacturing process and not adjusted. The objective of this is to be able to make many different lens prescriptions with a small number of parts. The parts will be able to cover a range of focus settings. Preferably there will be relatively small number of certain, coarsely spaced, focus powers on lens pairs that are maintained in stock. Fine-tuning will be accomplished by displacing the two lenses in the lens pair. The lens pair is then cut and placed into the frames. This process provides for the correction of focus but not astigmatism.

To also provide for the correction of focus and astigmatism a lens pair closest to the desired focus power is chosen from stock as described in 1) above. Adjustments are made in a first direction (the x-direction) to provide the desired focus. Then adjustments are made in a y-direction perpendicular to the x-direction to apply astigmatism correction to the lenses. In this case, we need to add a fourth equation to the previous three equations in the translating x-y form:

$(\partial^3 t/\partial x^3)|_{(x,y)=(0,0)}=2A$, $(\partial^3 t/\partial x \partial y^2)|_{(x,y)=(0,0)}=2A$, $(\partial^3 t/\partial x^2 \partial y)|_{(x,y)=(0,0)}=0$, $(\partial^3 t/\partial x^3)|_{(x,y)=(0,0)}=0$.

This last constraint slightly restricts the solution, we now require:

$(\partial^3 F(y)/\partial y^3)|_{(x,y)=(0,0)}=0$.

in the thickness formula $t=A(xy^2+\frac{1}{3}x^3)+Bx^2+Cxy+Dx+E+F(y)+F1(x,y)x^4+F2(y)x^3y+F3(y)x^2y^2+F4(y)xy^3$.

As an alternative, matched spherical surfaces can be on the inside. After adjustment, the lenses are glued together (preferably with refractive index matching glue) as a single unit with no air gap. This should provide a superior mechanical structure, and the internal surfaces are removed, but the optical performance may be somewhat inferior. If the attached lenses are rigid, then in order to make contact while still moving the lenses in 2 lateral directions, the inside surfaces must lie on a sphere or plane.

Pre-Fixing One Lens in Frame

In preferred embodiments one of the lenses in each of two two-lens units is prefixed in an eyeglass glasses frame prior to delivery to the eyeglasses maker. Since astigmatism typically requires an angular adjustment in this case and since the lenses are moved relative to each other in two perpendicular directions, both components of astigmatism cannot be achieved with this type of adjustment. As described above we adjust the lenses in x and y, and then rotate the attached set of lenses before we cut them out and mount them in the frame. In this case where one of the lenses is already mounted, we are missing a degree of freedom.

However, astigmatism can be described by two components, oriented 45° from each other. Equivalently, we can describe the same astigmatism by a magnitude and a direction. A given prescription for astigmatism can thus be created either by creating the proper strength oriented in the proper direction, or adding a given amount of 0° astigmatism to an amount of 45° astigmatism. Since focus is azimuthally symmetric, any orientation will create the same focus.

The direction of astigmatism correction depends on how we oriented the first lens in the frame. Therefore, in this embodiment the pre-mounted lenses are provided in various orientations, so that we can get the direction of astigmatism correct. Another approach is to provide the pre-mounted lenses with different levels of base corrections of the component of astigmatism which we cannot correct with the two direction movements.

The preferred solution is to have somewhat standard first lenses pre-edged for various frames, with a standard astigmatism orientation, and then offer second lenses in various models which provide the astigmatism correction in the direction which we cannot control by lateral shift. This has merit because it requires a minimum amount of inventory. One approach would be to have a few models of first lenses with widely spaced focus values for a given frame, and offer flexible second lens inserts which correct for example +−3 diopters of focus and +−3 diopters of 0° astigmatism due to lateral motion. The insert models can then be offered at several values of 45° astigmatism, spaced at say 0.5 diopter, and (if needed) a few widely spaced values of 0° astigmatism. We will also need a few widely spaced values of focus, which can be part of the first lens or the second lens inserts. If part of the first lens, we may need to cover (−6) to 4 diopter, which could require as few as 2-3 models. Thus the total number of second lens insert models could be less than 100, maybe as small as 10. The number of first lens models for each frame could be 1 to a few. There are obviously many ways to mix and match the corrections put into each part.

Flexible Lenses

Flexible lens technology has been developed for stick-on bifocals; see http://www.neoptx.com/ or U.S. Pat. No. 6,170, 952 that is incorporated herein by reference. Our concept would be to put the surfaces derived via the techniques described herein and in the parent applications onto the fixed lenses and also onto material similar to that described in the '952. To achieve a prescription correction, the flexible material is cut out with the appropriate lateral shift, and then applied to the fixed lens. The flexible lens can be attached by water or glue.

We have used the materials Texin from Bayer and Pellethane from Dow for the soft lens. We have used the generic materials Polycarbonate, Acrylic, and Nylon for the hard lenses. In all of these cases the material was injection molded into a cavity.

Figure 18A:
FIGS. 18A, B, C and D show features of a preferred embodiment.
Figure 18B:
Figure 18C:
Figure 18D:
Figure 20:
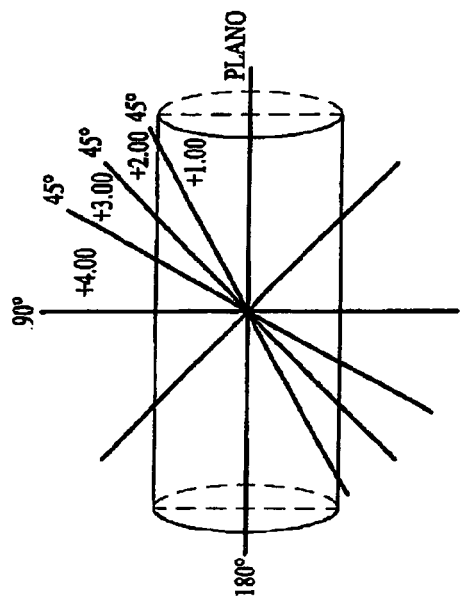
FIGS. 19, 20 and 21 show prior art eyeglass design techniques.
Figure 19:
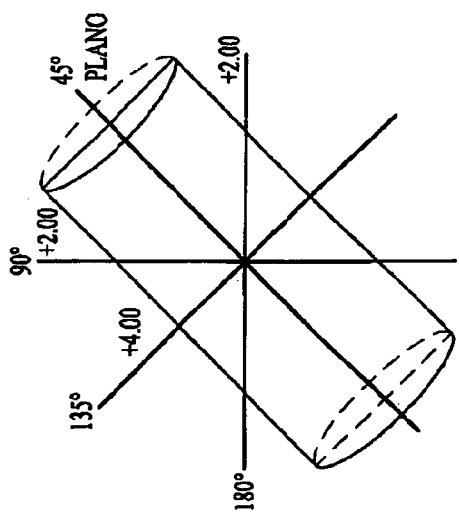
Figure 21:
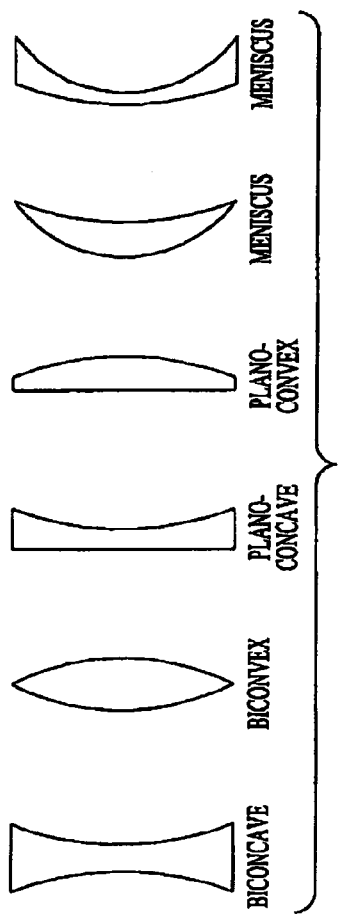

An example is shown in FIGS. 18A, B, C and D. FIG. 19A shows 2 lenses with the surfaces of the present invention on the inside. If these lenses are rigid, when we translate (with a little rotation); a gap forms as shown in FIG. 18B. If we instead put the special surfaces on the outside, and have a sphere or cylinder in the middle, the there is no gap as indicated in FIG. 18C. If the bottom lens is flexible, however, then we can bend the back lens so that there is no significant gap even with the special surfaces on the inside as indicated in FIG. 18D.

Specific Inventory Examples:

A single hard and soft lens pair is able to correct power with movement in one direction, and one of the two components of astigmatism with movement in the other direction. The component of astigmatism depends on orientation. If the lenses are rotated together to accommodate the prescription, the component of astigmatism can be pointed in the proper direction. If the hard lens is pre-mounted, however, rotation is unavailable, and the missing astigmatism component must be either ignored or corrected by applying that component to separate parts.

1. One Version Fits All: In this case, to cover much of the population, we would need a large range, typically +4 to −6 diopters. This would require one frame model with hard lenses mounted and one soft lens model, and would correct power and one axis of astigmatism.
2. Nearsighted/Farsighted Versions: This allows each set to adjust a smaller region of power, which makes the manufacturing easier and probably improves quality. There might be a +5 to 0 set and a −1 to −6 set for example. We preferably provide the base power offset on the hard lens, since it less common for a patient to have one nearsighted and one farsighted eye. This would require two frame models with nearsighted or farsighted hard lenses and one soft lens model. It is possible to put the base power offset on the soft lens, however.
3. Multiple Base Power Versions: There can be more than 2 models of power if required.
4. Multiple Astigmatism Versions for Full Astigmatism Correction: Our solution for achieving the missing astigmatism component is to manufacture different models of either the soft or hard lens with different amounts of this component. We might typically correct −2 to +2 diopters in ½ diopter steps. This example would require 9 models of added astigmatism lens. We prefer to put this component on the soft lens, since we prefer to supply the hard lenses already mounted in the frames, and the component will probably be different for each eye. Thus the number of parts for this case would be 9 soft lens parts and typically 2 frame parts with mounted hard lens.

An example manufacturing process would be to select frames with rigid front lens parts which have the base focus nearest to the requirement, then find the flexible back part which has the selected astigmatism component nearest to the requirement, then cut the soft rear lens with the proper offset to set the power and adjustable astigmatism component, then mount the rear lens onto the front lens.

In order to pick the translation amount between the first and second lens, any of the following are 4 techniques could be used:

1. Put fiducials on each lens, such as with stick-ons, and then move the fiducials a specific distance calibrated to the lens pair.
2. Use a lensmeter to measure the amount of focus and astigmatism in the lens pair, and adjust to the desired value
3. Use templates to cut out the second lens, where the template is offset the proper amount determined by the calibration of the lens pair.
4. Have the buyer look through the lenses, and adjust the orientation to most improve the buyer's vision.

Determination of the Lens Offsets to Provide the Prescription Correction:

The following are methods to offset the lenses properly based on the patient requirements so as to apply the proper amounts of power and/or cylinder correction:

1. Known Prescriptions, Precut: In this case the required prescription correction is known. The prescription is converted based on the lens profile parameters into a horizontal and vertical attachment offset.
2. Known Prescriptions, Postcut: In this case again the prescription is known. The soft lens is again attached to the hard lens with the proper offset, but in this case the full soft lens is attached. After attachment the soft lens is cut such as with scissors.
3. Unknown Prescription, Measure First: In this case the prescription is unknown, and the offsets are found by the patient looking through the lenses themselves. The hard lens may be mounted or unmounted in the frame for the measurement. The soft lens is moved laterally until the patient has best vision. The offset is recorded such as by scribing the position. This recorded offset is then used to position the soft lens.
4. Unknown Prescription, Set In Place: In this case the prescription is again unknown, and the patient again positions the lenses for best vision correction, but in this case the lenses are pressed together and attached at least temporarily while the patient is looking through them. The excess soft lens around the perimeter is cut away after this attachment.

Adhesion Techniques

1. Certain materials such as Texin adhere on contact by pressing to the hard lens. These lenses can be attached through pressing together with no adhesive. The lens surfaces adhere best when lightly buffed with a cloth.
2. The lenses can be glued through the entire contact region using standard optical adhesives. Lower cost adhesives such as dilute wood glue produce an acceptable bond for some combinations.
3. The lenses can be attached around the perimeter with a thin double-sided tape ring.
4. The lenses can be held in place around the perimeters by the frames, but not attached to each other.
5. Use of a Suction Cup Bending design in all of the above cases can be used.

Commercialization of the Present Invention

Following are some tentative plans for commercializing the present invention:

Low Cost Eye Corrections

Fixed lens eyeglasses provided according to the present invention are expected to be available at relatively low cost as compared to prior art prescription glasses. Therefore Applicants expect a very large market for the glasses made up of persons unable or unwilling to purchase the prior art prescription glasses.

Emergency Eyeglasses

Emergency prescription eyewear could be dispensed at places such as police stations, military, cruise ships, airlines and drugstores that consist of only a few different frame models with pre-mounted front lenses and a number of flexible back lenses.

Eye Doctor in a Suitcase

The portable eyeglass lab would consist of 1) a suitcase containing 2) a handheld or portable auto-refractor to determine a patient's prescription, 3) an assortment of frames with pre-mounted front lenses, 4) an assortment of flexible back lens blanks, 5) an assortment of dies matching the shapes of the offered frames, 6) a die press to cut out the back lens, 7) solution to attach the back lens to the front lens, 8) instruction set or calculation means to indicate which front and back lens to use and how to position the back lens for die cut. The auto-refractor could be an adjustable frame where the patient self adjusts the moveable lenses until best vision is achieved. The die and die press could be replaced with more advanced, programmable devices like a vinyl cutter.

Eyeglass Vending Machine

A kiosk containing an assortment of frames with pre-mounted front lenses, an assortment of back lenses, a vinyl cutter or die cutter, and an assembly machine could be used to dispense readymade prescription eyeglasses. The kiosk could contain an eye examination component (either objectively with an auto-refractor, or subjectively via self alignment of internal lens pairs by the patient), and/or a data input device that can accept a patient's prescription values. After inputting prescription data, frame preference, and payment information, robotic devices inside the kiosk take a frame with correct front lens out of internal inventory, cut the matching back lens according to the prescription data, adhere back lenses to front lenses in the correct position, and dispense custom made eyeglasses.

Prior Art Eyeglass Outlets

In the prior art new eyeglass frames are typically fitted with plano lenses for demonstration purposes and to adhere stickers. Many people have such poor vision that they cannot see themselves in the mirror to observe how they look with the frames they are considering. In one embodiment of the present invention eyeglass frames are fitted by the frame manufacturer with front lenses of the present invention instead of plano lenses. The frames are distributed through the usual distribution channels and end up being displayed in display racks at dispensaries. The dispenser adds the complementary flexible back lens of the present invention to provide the patient's sphere equivalent prescription. This allows the near or far sighted patient to see him/herself in the mirror while trying out the new frames. Once the patient decides on a frame, either fully correcting lenses or conventional lenses could be fitted into the frame.

Adjustable Focus Frame Designs

The present invention provides methods for eyeglass makers to offer fixed lens corrective eyeglasses with a minimum of lens inventory. This application is not directed at adjustable focus frame designs; however, many of the lenses and some of the techniques described above may be applicable with respect to eyeglasses with adjustable focus frame designs. Also makers of fixed lens eyeglasses utilizing embodiments of the present invention as described above may also desire to offer to supply their customers with adjustable focus eyeglasses. In this case frames must be available which can provide relative movement of one or both of the lenses in each lens unit in order to provide the focus adjustment. Therefore, this section from the parent application Ser. No. 11/607,130 is continued in this application.

First Frame Design

Figure 7A:
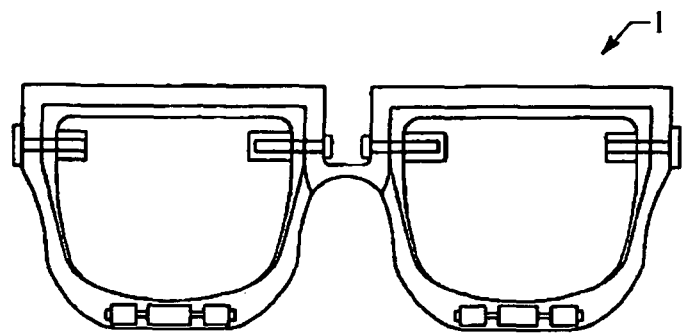
FIGS. 7A and 7B show features of a frame design for horizontal relative lens motion.
Figure 7B:
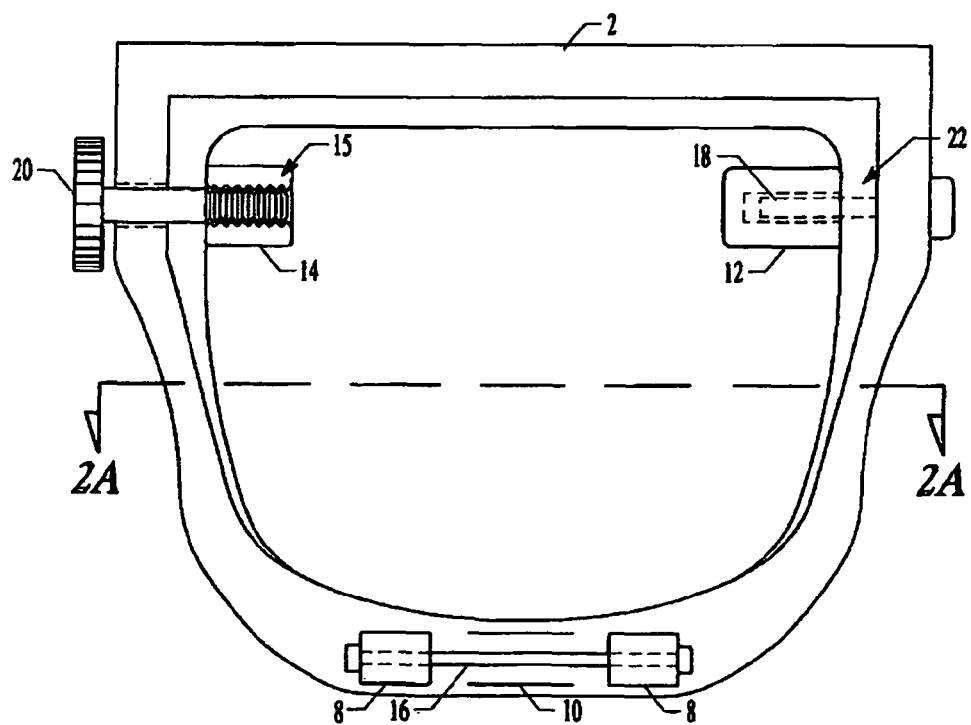

A first proposed version of a frame design that permits lateral relative motion of the lens elements in each lens unit is shown in FIG. 7A. This is a drawing of a pair of eyeglasses with wearer operated focusing lenses. A more detailed version of one of the lens units is shown in FIG. 7B. This embodiment includes metal or plastic frame 2, two back lenses 4 and two front lenses 6. Back lenses 4 are mounted rigidly on frame 2. Front lenses 6 are mounted so that they can be moved laterally with respect to back lenses 4. Two pen mounts 8 are attached rigidly to frame 2 and tabs 10, 12 and 14 are attached rigidly to front lenses 6. Pen 16 passes through pen mounts 8, allowing it to slide through tab 10. Pen 18 passes through frame 2, allowing it to slide through tab 12. Adjustment screw 20 passes through frame 2 and screws into treaded socket 15 in tab 14. Spring 22 between frame 2 and tab 12 provides a compressive force in the direction of adjustment screw 20. The wearer of the glasses shown in FIG. 7A adjusts the focus of each of the lenses by rotating adjustment screws 20 as shown in FIG. 7B.

Techniques for Use

This simple preferred embodiment of the present invention provides important improvements over prior art glasses such as bifocals, trifocals and continuous focal lenses. The lens units can each be adjusted by the user so that his viewed object at any distance from a few inches to infinity is exactly in focus. This is especially advantageous if the viewed object is stationary with respect to the wearer such as when reading, working at the computer, watching TV and watching a movie. Many of the potential embodiments of the present inventions do not provide for very quick adjustment of the focus. This could be somewhat of a problem in situations, for example, when a student is watching a lecturer and taking notes at the same time. A simple solution in these situations, however, would be to provide for separate adjustment of the two lens units and for the wearer to adjust one lens units to focus on the lecturer and the other lens units to focus on his notes. His brain will then take over and in each case produce images using data from the in-focus eye.

Movement Directions

The lenses can be moved separately or as units. Either lens of a lens pair can be moved, but the preferred approach is to move both lenses in opposite directions to achieve maximum differential movement with a minimum of absolute movement. In addition, the lenses can be adjusted using actuation from both sides simultaneously, one particular side only, or either side. Designs which can be actuated from either side allow the most ergonomic operation, and such designs with this property are described below.

FIG. 1A shows lens movement in the vertical direction. In this case the front lens element can be moved as a unit, and the back lens element moved as a unit. Applicant discusses a variety of approaches to constrain the motion to the proper displacement.

Figure 1B:
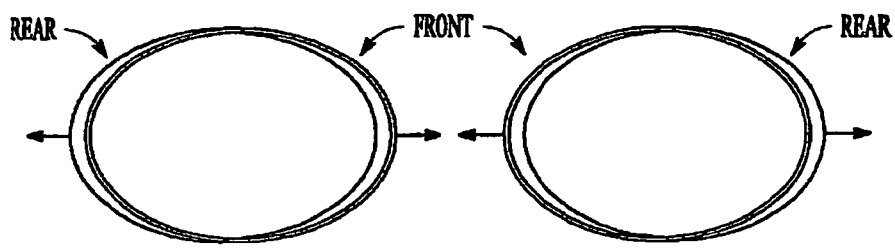

FIG. 1B shows lens movement in the horizontal direction. In this case the front lens element can be moved as a unit, and the back lens element either fixed or moved as a unit; however, for this case it may be preferable to connect one front lens to the back lens on the other eye, and vice versa ("crossover"). The crossover movement keeps the motion more symmetrical between the two eyes.

Figure 1C:
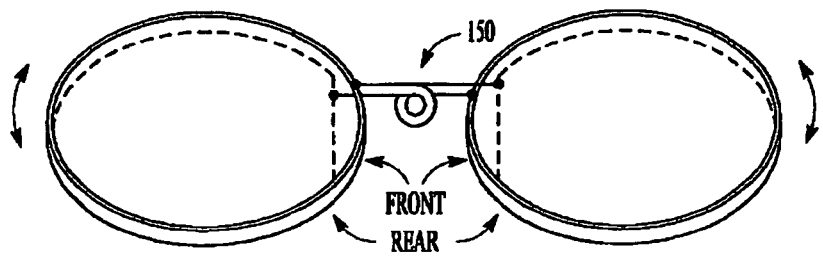
Figure 1D:
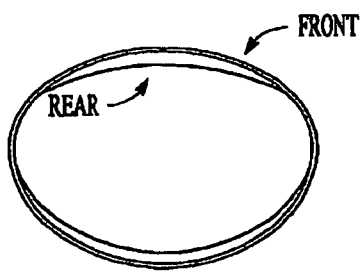
FIG. 1D shows the general shape of preferred lens elements and an "eye center".
Figures 3A, 3B, 3C:
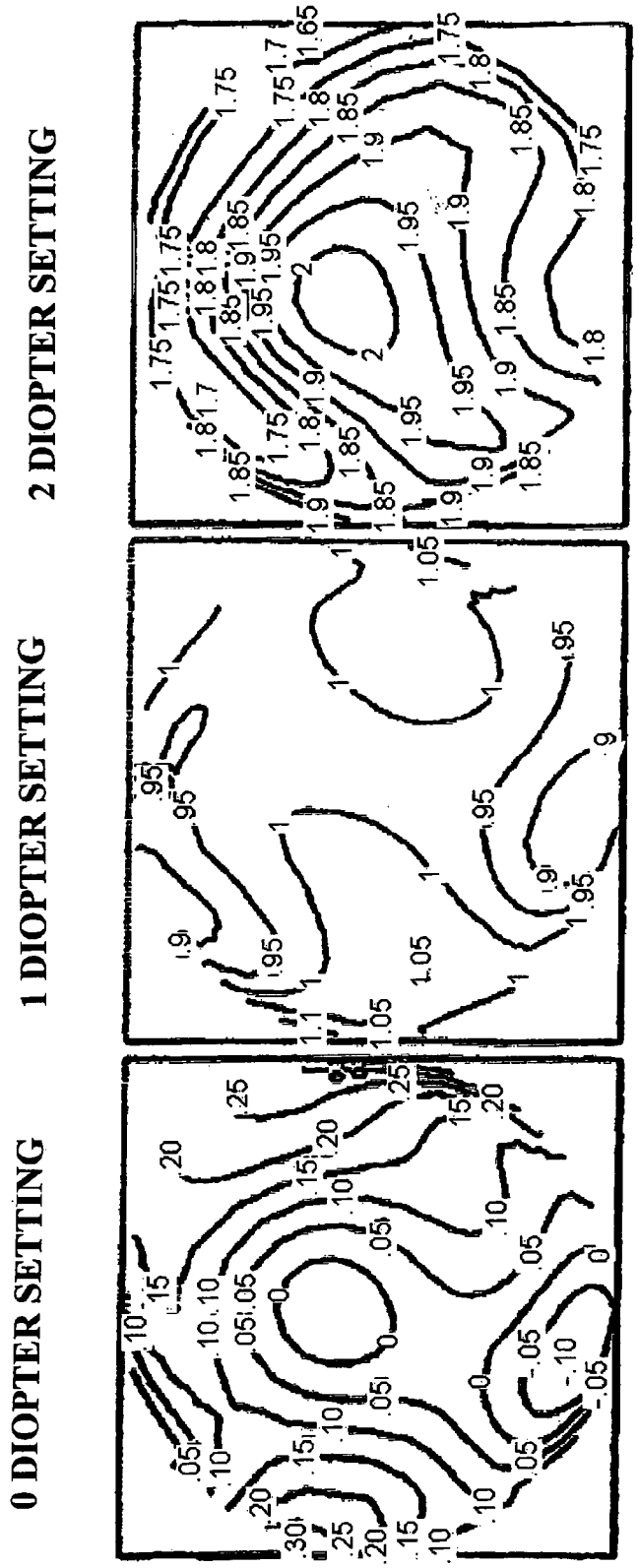

FIG. 1C shows pivot motion. In this case, as in the horizontal motion case, the front lens element can be moved as a unit, and the back lens element either fixed or moved as a unit; however, for this case it may be preferable to connect one front lens to the back lens on the other eye, and vice versa. The crossover pivot keeps the motion more symmetrical between the two eyes.

Vertical Movement to Adjust Focus

There are some significant advantages of using vertical adjustment of the two lens elements relative to each other to provide focus changes. The principles described above for horizontal adjustment apply equally well for the vertical adjustment, by interpreting x as the vertical direction and y as the horizontal direction.

Figure 8:
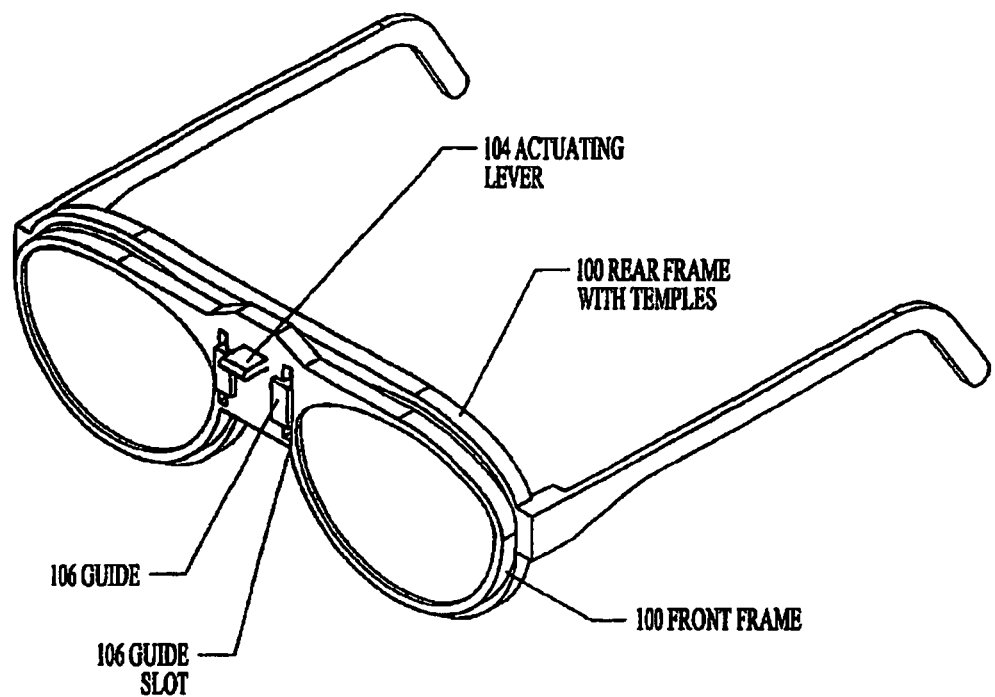
FIG. 8 shows a frame design for vertical relative lens motion.

A frame design for vertical relative motion is shown in FIG. 8. In this design, rear frame 100 is positioned on a wearer in the same manner as regular glasses. Front frame 102 is mounted on frame 100 with slide guide 106 and slide slot 108 so that front frame 102 is free to slide up and down relative to rear frame 100 but can not move sideways relative to rear frame 100. The wearer is able to position front frame 102 relative to rear frame 100 by pushing on actuating tab 104 in order to adjust the focus of the lenses. Close tolerances between guide 106 and guide slot 108 hold the front frame in position after it has been positioned by the wearer.

Figure 9A:
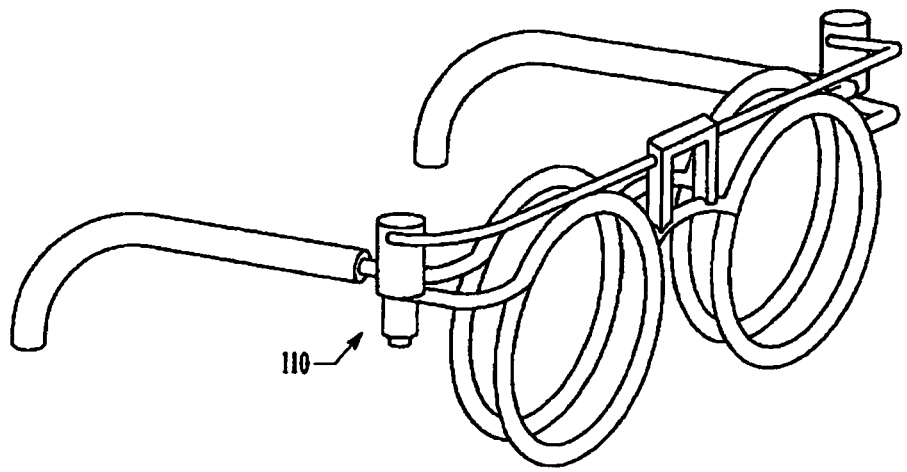
Figure 9B:
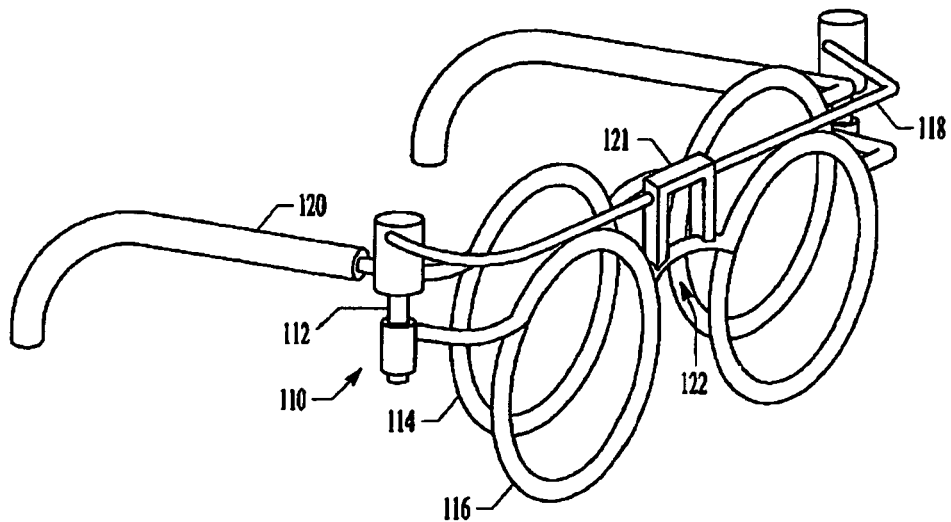
Figure 9C:
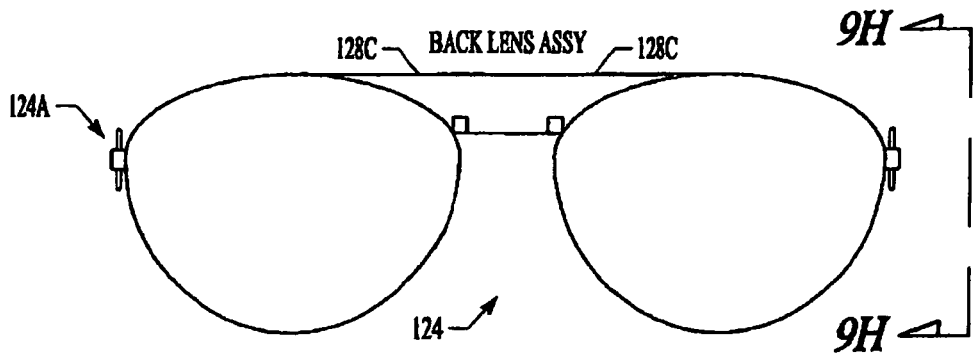
Figure 9D:
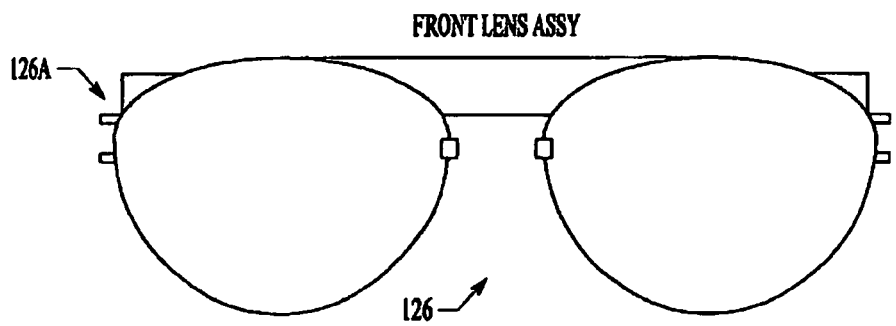
Figure 9E:
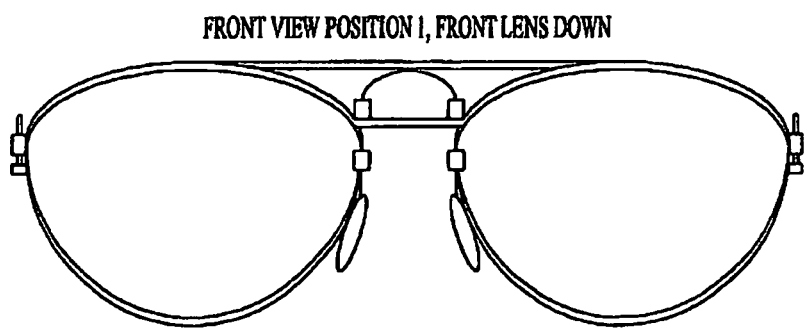

FIGS. 9A and 9B show another frame design for adjusting the front frame up and down relatively to the rear frame. In this case slide ring 110 that is a part of front frame 116 slides up and down on shaft 112 that is a part of rear frame 114. The wearer adjusts the relative positions of the two frames by adjusting pivot bar 118. The earpieces 120 are a part of rear frame 114 and the nose rest 122 is a part of front frame 115. Front frame 115 hangs from pivot bar 118 via hang element 121 that pivots about pivot bar 118 and a pivot connection at nose rest 122 so that the displacement of frame 116, produced by the pivoting of pivot bar 118, does not alter the spacing between the two frames.

FIGS. 9C through 9I show features of a frame design similar to the one described above. This frame includes back lens assembly 124, front lens assembly 126, a torsion bar assembly 128, two adjusting side bars 130 and a nose piece assembly 132 and ear piece 134. The torsion bar assembly includes torsion bar 128A two sleeves 128B (through which bar 128A is free to pivot) that are rigidly attached to back lens assembly at locations 128C. Bar 128A is pivotably attached to front lens frame assembly 126 at locations 128D. The two adjusting side bars 130 are pivotably attached to ear piece 134 at location 134A and are attached to front lens assembly at location 134B as shown in FIG. 9G. Back lens assembly 124 includes peg attachment 124A which is comprised of two curved pegs as shown in FIG. 9H. Front lens assembly 126 includes two sleeve attachments 126A each attachment having two sleeves that slide in a general up and down direction on the pegs of peg attachment 124A. Preferably the curve of the pegs matches the nominal radius of curvature of the lenses. This frame also includes nose piece assembly 136 on which both front and back lens assemblies rest via sleeves 124B and 126B and stops 136A. With this feature the eyeglasses are positioned based on the location of the lowest of the two lens assemblies. Therefore, the movement of the center of the lens units relative to the wearer's eyes moves only half as far as in the FIG. 8 example. Front lens assembly 126 is raised relative to back lens assembly 124 by squeezing bar 130 and earpiece 134 at location 134A and lowered by squeezing at 134B as shown in FIG. 9G. Torsion bar 128 is preferably stiff enough to assure that the relative motion of the lens elements in both lens units is approximately the same. The movement up or down of the front lens elements in one of the lens units relative to the rear lens element induces a torque on torsion bar 128A which produces a corresponding movement in the front lens element in the other lens unit.

Figure 11A:
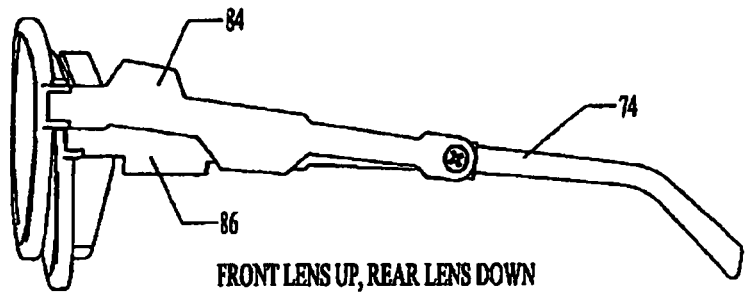
FIGS. 11A through 11C show features of a fourth frame design for vertical lens motion.
Figure 11B:
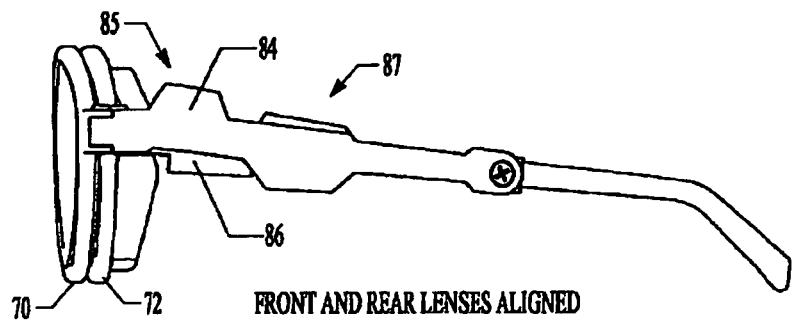
Figure 11C:
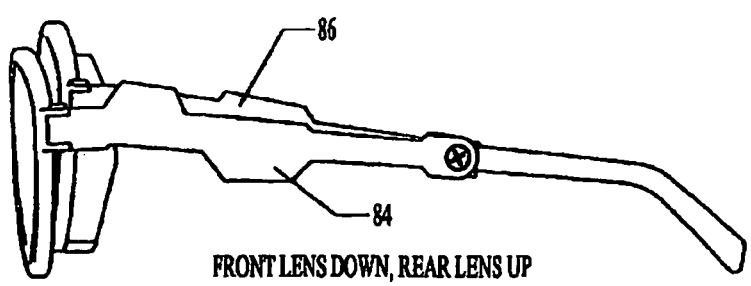
Figure 12A:
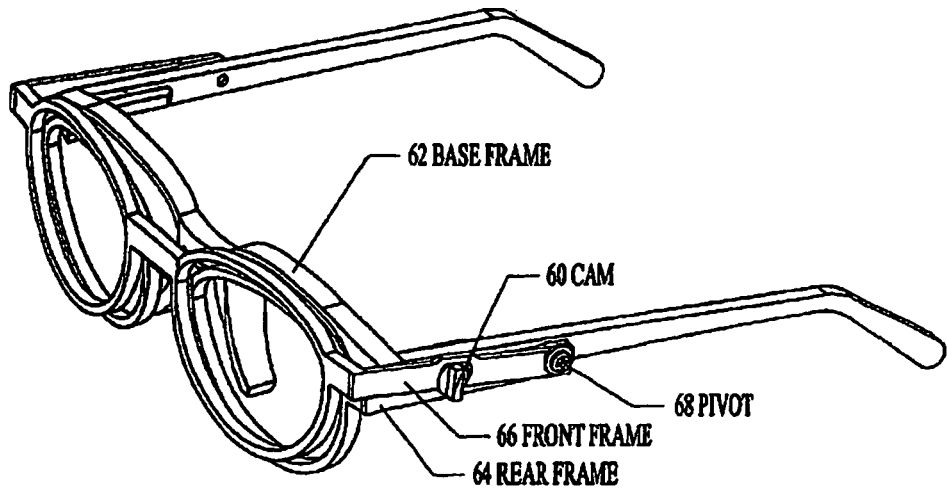
FIGS. 12A through 12D show features of a fifth frame design for vertical lens motion.
Figure 12B:
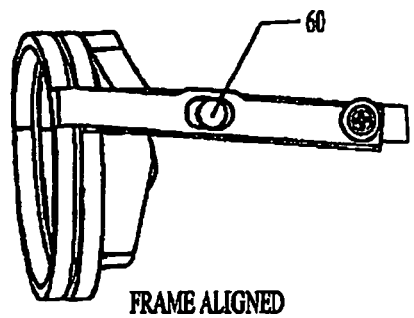
Figure 12C:
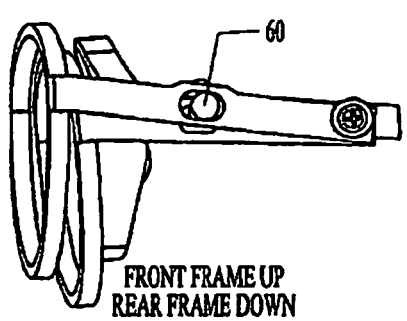
Figure 12D:
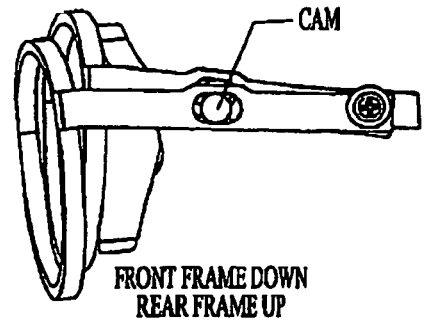

FIGS. 10A through 10E show features of a prototype frame design. In this version support frame 74 fits on the wearers head just as regular glasses. The lenses, both rear lenses 98R and 98L and front lenses 96R and 96L are contained in separate frames, rear frame 72 and front frame 70, that move relative to support frame 74. Frames 70 and 72 pivot about left and right pivot mounts (left mount 92L and pivot screw 94L are shown). FIG. 11B shows the two lenses aligned. The wearer raises front lenses 96L and 96R in front frame 70 and lowers rear lenses 98L and 98R in rear frame 72 to positions such as the one shown in FIG. 11A by squeezing frame temple arms at position 87 as shown in FIG. 11B. The wearer moves the lenses in the opposite directions by squeezing frame temple arms at position 85 as shown in FIG. 11B. The result is shown in FIG. 11C.

FIGS. 12A through 12D shows a variation of the FIGS. 10A-E version. The FIGS. 12A-D version is the same as the FIGS. 10A-E version except the wearer adjusts the relative positions of the lenses by turning cam 60 instead of squeezing the temple arms.

Direction of Lens Movement

Preferably the relative motion of the two lens elements in a lens unit is in directions related to the nominal curvature of the lens unit. For example if the nominal curvature of the lens unit is 150 mm; their relative motion preferably could be along a radius approximately 150 mm behind the center of the lens unit. However, optical analysis performed by Applicants has shown that tolerances on this issue is loose and (for the 150 mm nominal curvature example) the lens unit performs acceptably if the radius is within the range of about 50 mm to infinity (parallel motion). For embodiments where the nominal curvature of the lenses is flat, relative motion should be parallel. In the examples shown in FIGS. 10A through 10E the relative motion of the two lenses is defined by radii of about 50 mm. In the FIG. 8 example a curvature such as 150 mm could be designed into guide 106 and guide slot 108. In the 9A and 9B example the shaft 112 and sleeves 110 could be designed for a curvature of 150 or any other desired curvature.

Horizontal Movement to Adjust Focus

Figure 16A:
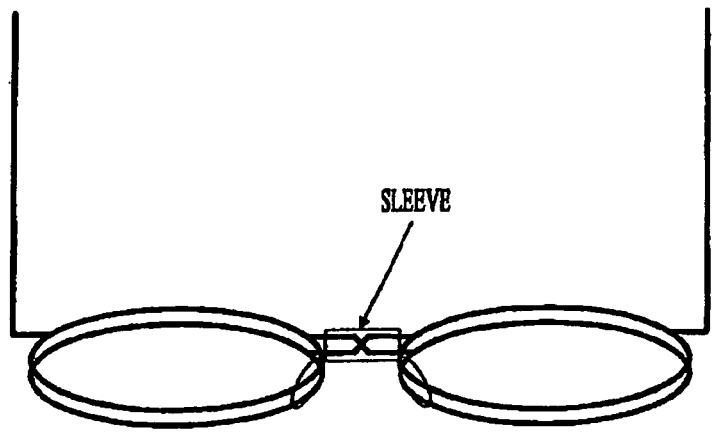
FIGS. 16A and 16B show a frame system for side to side adjustment.
Figure 16B:
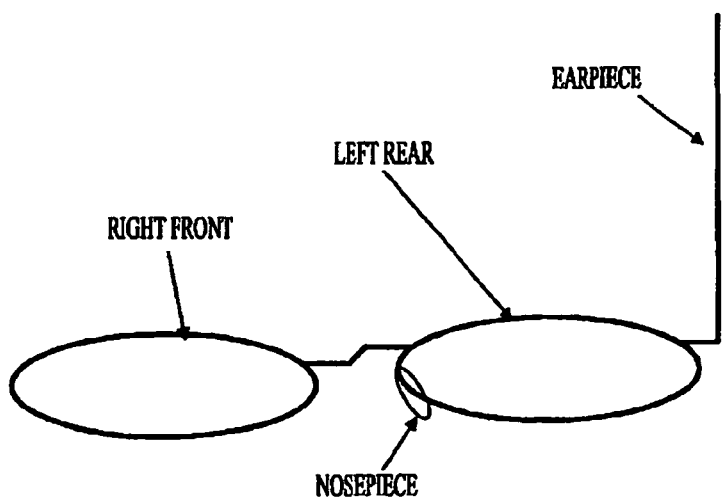

An example of horizontal motion frames is shown in FIGS. 16A and 16B. In one of the units, the left rear lens is attached to the right front lens, an earpiece, and a nosepiece. An identical but mirror-image unit is attached to this unit via a sleeve, allowing horizontal motion.

Pivot Adjustments of Focus

Eyeglasses made with lens pairs that are differentially rotated around a pivot point outside of the lenses. The rotation is in a rotation plane approximately perpendicular to the axes of the lenses and about a pivot point in the rotation plane. In embodiments of the present invention the surface design of the lenses is much more complicated than in the Alvarez type embodiments and the designs described in the parent applications referred to in the opening sentence of this specification, but the mechanism to move the lenses to achieve desired focusing power turns out to be simpler and more precise as compared to the linear movements. The pivot point is preferably equidistant from the two eyes. This preferred rotation point can be the midpoint between the two eyes, or any point above or below the midpoint.

Angular Adjustment with Crossover Pivot Mechanism FIGS. 13A-13G are drawings showing features of a preferred embodiment providing angular adjustment of the lenses of a set of eyeglasses using a crossover pivot configuration. In this configuration the lenses pivot about a pivot mechanism 150 identified in FIGS. 13B and 13G. Nose pieces 152 are attached rigidly to pivot axle 154 in pivot mechanism 150. All four lenses pivot about pivot mechanism 150. Right front lens 156 is rigidly attached to left rear lens 158 and left front lens 160 is rigidly attached to right rear lens 162 so the lenses move in a scissors-like manner about pivot mechanism 150. The pivot mechanism 150 and the connections to the lenses and nose piece are shown in FIG. 1G. Each of the two ear supports 164 attach to one of the rear lenses in the manner shown in FIG. 13D.

Angular Adjustment with Pivoting Front Lenses FIGS. 14A-14G are drawings showing features of a preferred embodiment providing angular adjustment of the lenses of a set of eyeglasses where front lenses pivot relative to back lenses. In this embodiment both rear lenses are rigidly attached to the nose piece and hinge-like to ear supports 164. The front lenses pivot about pivot 150A. Tab units 166 attached to the front lenses limit range of movement of the front lenses.

Angular Adjustment with Special Pivot Mechanism

Figure 15A:
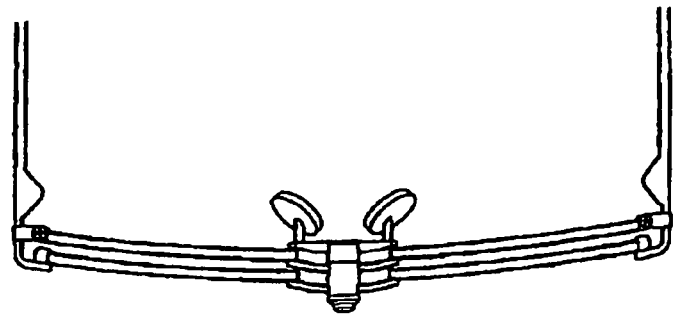
FIGS. 15A through 15H show features of a third frame design for pivotal lens motion.
Figure 15B:
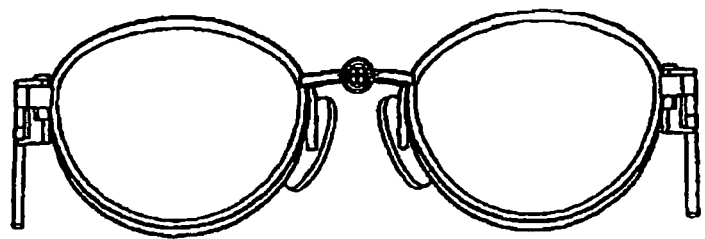
Figure 15C:
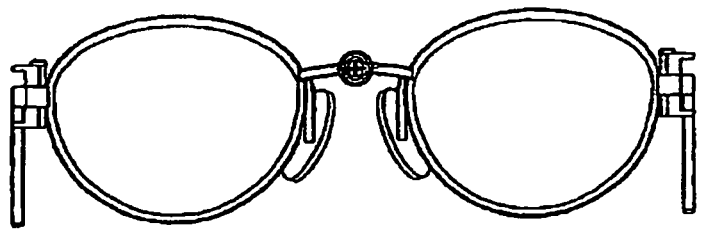
Figure 15D:
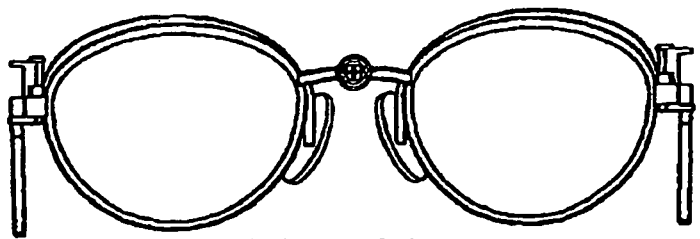
Figure 15E:
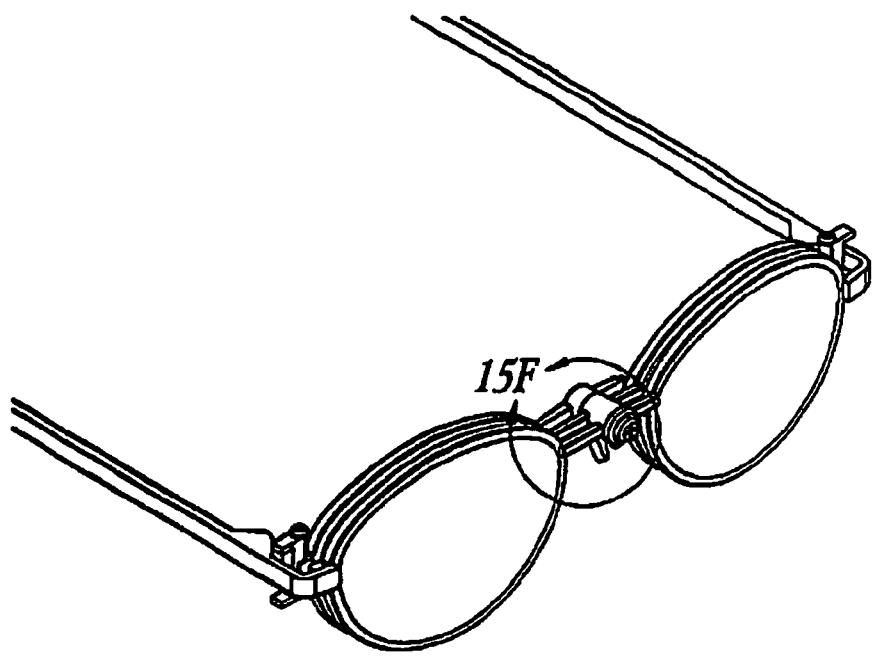
Figure 15F:
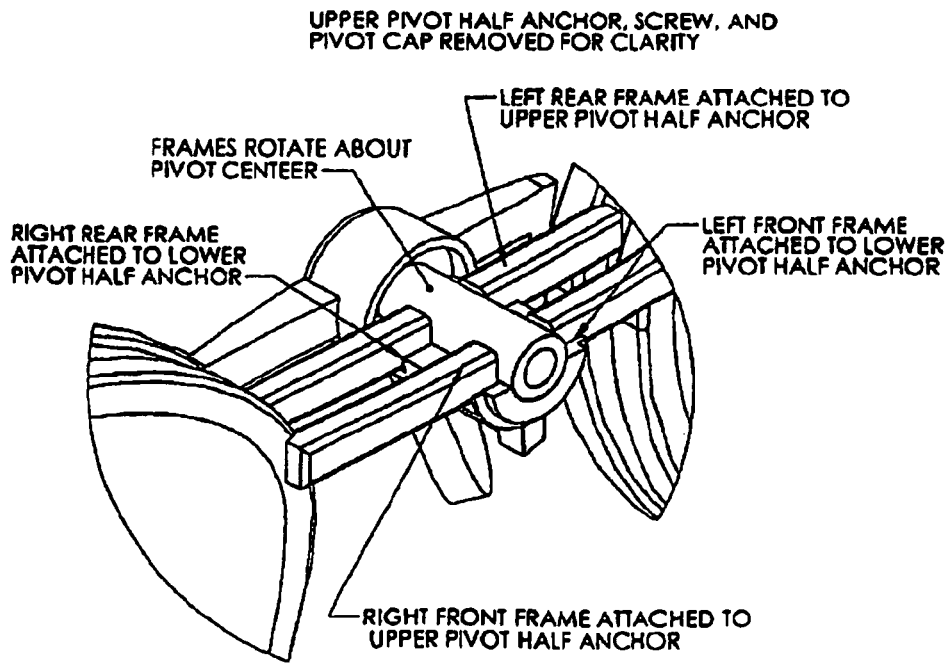
Figure 15G:
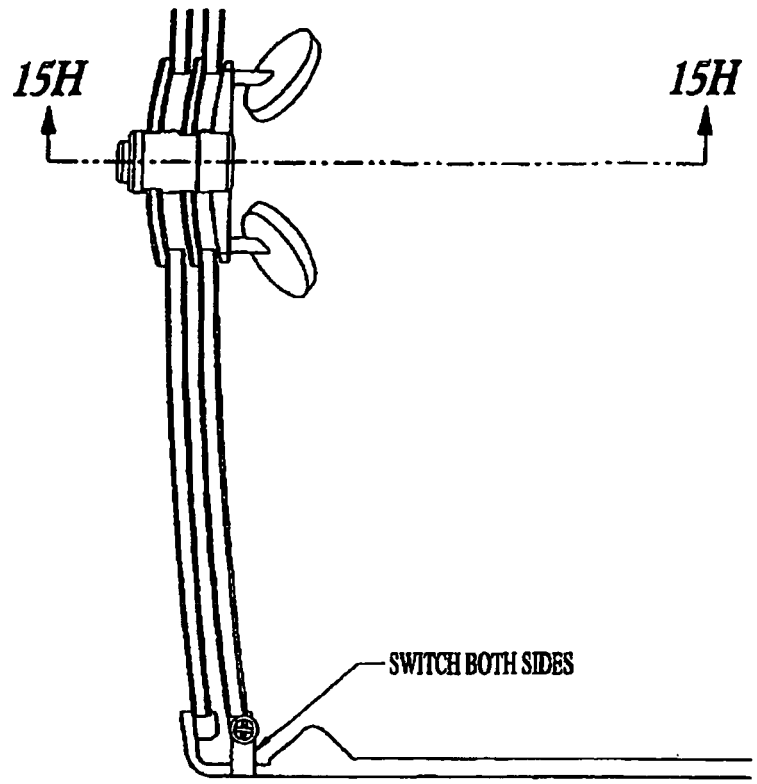
Figure 15H:
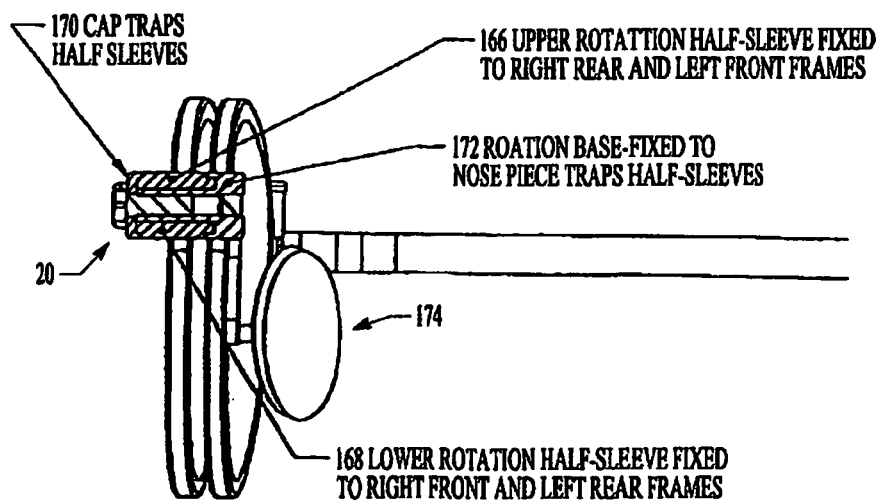

FIGS. 15A-15H show detailed design features of a preferred embodiment having a special pivot mechanism that can be easily disassemble to permit cleaning of the lens elements. In this design, which is similar the design shown in FIGS. 13A-13G, the pivot mechanism (as shown in FIG. 15H) is provided by two half-sleeves 166 and 168 which are trapped by front cap 170 and which rotate about a rotation base 172 that is fixed to nose piece 174, with the right front and left rear lens elements rigidly attached on one half-sleeve and the left front and right rear lens elements rigidly attached on the other half-sleeve. The sleeves being trapped by the base and the end cap can only rotate. Some friction is preferably built in to hold the positions of the lens elements when no force is being applied. Additional friction can be applied by tightening Philips screw 176 which can also be removed to permit disassembly and cleaning the inside surfaces of the lens elements.

Advantages of Adjustment about a Pivot Point

Figure 13A:
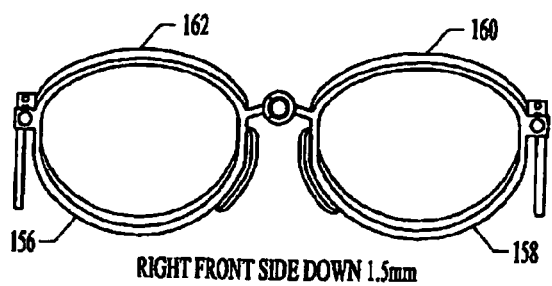
FIGS. 13A through 13G show features of a frame design for pivotal lens motion.
Figure 13D:
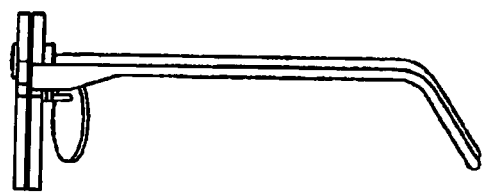
Figure 13B:
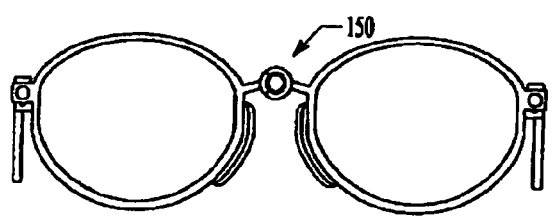
Figure 13E:
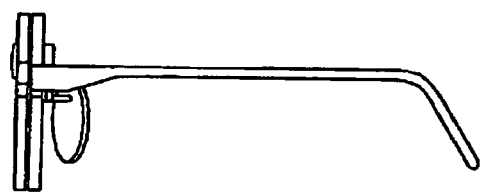
Figure 13C:
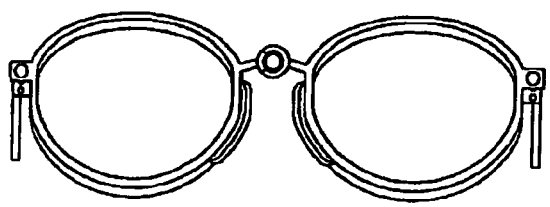
Figure 13F:
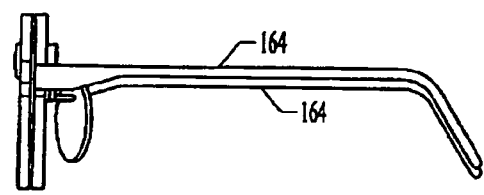
Figure 13G:
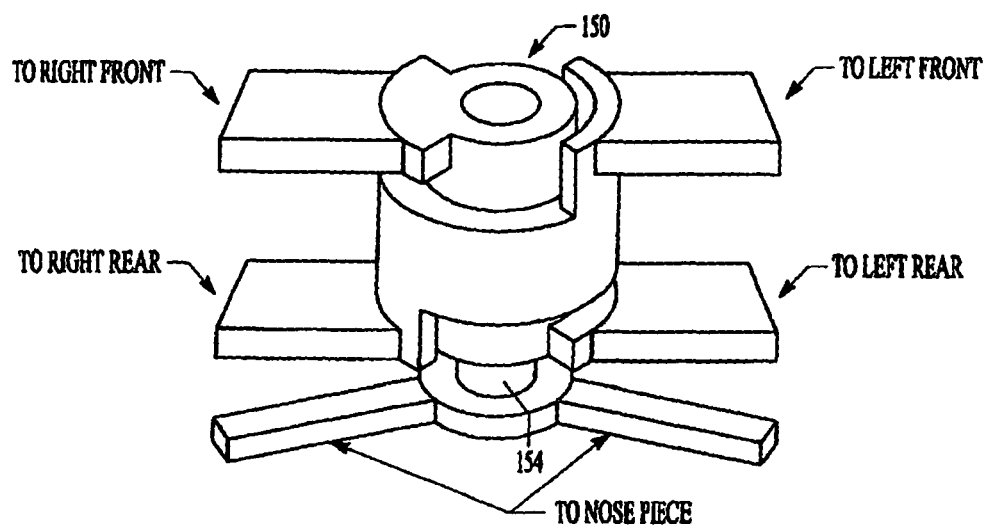

The special surface design to provide adjustable focus about a pivot point is quite a bit more complicated than the surface design for a linear adjustment. However, as indicated in FIGS. 13A-13G movement of the lenses about a pivot point greatly simplifies the frame design to accomplish the relative lens movements as compared to sliding the lenses linearly in a linear direction as proposed in Alvarez patents. With the pivot type embodiments, existing frame designs can be used along with a simple pivot type mechanism as shown in FIG. 13G. The pivot design as shown in FIG. 13A-13G assures that all relative movements are perfectly symmetrical. This is difficult to accomplish with the linear motion techniques.

Automatic Adjustments of Focus

Several prior art patents have proposed techniques for automatic adjustments of the focus of eyeglass lenses. These techniques attempt to determine the distance to the viewed object and then automatically adjust the focus of the lenses in the eyeglasses based on stored information so that the object is in focus for the wearer. These techniques include range finders and small camera viewing both eyes to detect distances between the pupils and small processors and drivers to calculate distances and control focus based on the calculated distances. Cues from the wearer can also be used as a signal to provide an automatic adjustment of the focus. For example, a wink of only the right eye could be a cue to increase the length of focus and a wink of only the left eye could be a cue to decrease it. Head motion or eyebrow motion could also be used as a cue. Additional equipment would have to be added to the basic embodiment described above. Needed would be a motor and actuator with a power source to provide the lateral displacement provided in the example by adjustment screw 20. A small processor could be used to translate cues provided by the range finder, camera or wearer into instructions for the motor and actuator. Specific equipment of this general type for determining distances to viewed objects is described in the patents referenced in the background section.

As an example, a system can be used to measure inter-pupil distance. This system would provide a determination of the distance of the object that the eyes are pointed at. If an object is far away, each eye is pointed in approximately the same direction. As the object moves closer, the eyes start to cross so that both are pointed at the object. Small cameras can take digital images of each of the eyes and a miniature digital processor can compute the offset distance that maximizes the correlation of the two images. This offset, when added to the camera separation, yields inter-pupil distance. This inter-pupil distance can be converted by the same digital processor into a range to the object, which is then converted to an offset distance for the sliding lenses. The processor then commands the motor/actuator to position the lenses in the proper position.

Computer Simulations

Various optical designs based on the present invention have been tested with computer simulations. Specific simulations were made using computer aided design software available from Zemax Development Corporation with offices in Bellevue, Wash. Several simulations were made for lens pairs with optical powers of 0 diopter, +2 diopters, and −2 diopters at angles of 0 degrees, 30 degrees up, 30 degrees down, 30 degrees left and 30 degrees right. In all cases the simulations show results that are about the same or better than standard fixed focus prior art spectacle lenses for correcting focus. Examples of these simulations are discussed above in the section entitled "ZEMAX Optimization" shown in FIGS. 2A through 2C and in FIG. 17.

Variations

Many variations of the specific embodiments described above are possible within the scope of the present invention. For example design codes could be utilized to optimize thicknesses. The Alverez equations could be used to provide thickness profiles. Each lens element could include a power base to which the specialized surfaces are applied. One lens of each two-lens unit could be fixed in an eyeglass frame prior to delivery to the eyeglass maker. This could be the front lens or the back lens. At least one lens of each two-lens unit may be pre-edged prior to delivery to the eyeglasses maker. The front and back lenses may be attached to each other prior to mounting in the eyeglass frame. An uncorrected component of astigmatism uncorrected by lateral shift may be provided for by adding that component to various models of one or both lenses. Several models of two-lens units designed to correct astigmatism in different directions may be included in the eyeglass maker's inventory so that the maker can correct astigmatism with a single lateral movement without rotation of the lenses. A procedure can be established in which a customer selects a frame then precut lenses are selected and mounted in the frame and finally the second lenses are attached to the precut lenses to achieve a prescription correction. The second lens alternatively may be attached to the first precut lenses before the precut lenses are inserted in the frame. The first lenses could be mounted in the frames made available to customers for frame selection. After selection the second lenses are attached. The lenses may be coated prior to assembly in frames. The contact surfaces between rigid lenses can be a sphere cylinder or plane permitting ease of relative movement between the lenses. One of the two lenses in the two-lens units could be made of a variety of transparent flexible material. A base correction can be provided for the two-lens units in the null position. The base correction can include a progressive correction, a bifocal correction or a trifocal correction. A variety of lens models can be provided in eyeglass maker's inventory to provide a minimized inventory permitting a range of common corrections by combining part selection and lateral positioning.

A variety of prior art techniques can be utilized to determine the eyeglass correction needed by customers. These techniques include eye examination by an eye doctor resulting in a eyeglasses prescription. Many devices are commercially available for determining correction needed. In some cases an adjustable focus frame, of the type disclosed herein and in the parent applications, may be provided to the customer so that the customer can by himself or with the assistance of the eyeglass maker determine the best positioning of the lenses in the two-lens units for proper focus and or proper astigmatism correction. The lenses can then be fixed in place after the proper positioning is determined. There may be situations where one of the lens units of a pair of eyeglasses would be designed for an adjustable focus. The focus can be near, far or in between. Lateral adjustments can be provided with a micrometer operated by the patient to focus his eyes at various distances and having a read-out on a computer screen indicating lens power needed for focusing at those distances. Such devices might be provided at drug stores selling inexpensive lenses for reading. In addition the lenses might be used to confirm a prescription. In these adjustable focus frames the lens can move up and down, side to side, or at any other direction predominately perpendicular to the wearer's line of sight. The moving lenses for each eye can move in common (best for up and down) or in different directions such as out and in away from the nose. Also, both lenses for each eye can move at the same time in opposite directions. Optimized surfaces can be applied to any of the four surfaces of the two lenses; however, it is best to optimize all of the surfaces.

Lens units of the present invention can be utilized in many applications other than for eyeglasses. The concepts can be applied to almost any situation where adjustable focusing is needed. These include microscopes, cameras, copy machines and magnifying glasses.

The pivot location does not have to be between the wearer's eyes. For example, each lens unit could be designed with a pivot location at the outside edge of the eyeglasses or at the top or bottom of the lens units.

Manufacturing techniques that could be employed include: machining (such as with numerically controlled equipment), molding, casting, curing and use of gradient index lenses for which thickness is replaced by "optical path length" defined by:

$(n-1)*(\text{thickness})$ where n is the index of refraction. Potential range finders include optical, laser and acoustic. Cues for automatic changing of focus could include blinking, eyebrow motion, head motion, and hand switches.

In the preferred embodiments and in the claims, surface shapes are sometimes defined with mathematical equations. Minor modifications to the equations can be made without causing variations that could significantly adversely affect the performance of the lens systems. Therefore, in his claims Applicant has used the term "approximately" in connection with these equations with the intention of claiming systems that utilize surfaces that are defined by equations that are not exactly the same as the referenced equations but achieve the same result within the tolerance of the lens system as it is being applied. Also, when he refers to A for one lens element being the complement, or "substantially the complement", of A for the other lens element, he means that their magnitudes are so close to each other that any difference results in effects that are within the tolerance of the lens system to which the equations are being applied. When applied to eyeglasses the applicable tolerance is the ability of the human eye to detect a difference.

The reader should understand that the present invention is not limited to the specific embodiments described above and that many modifications and additions or deletions could be made to those described embodiments. Therefore, the scope of the invention should be determined by the appended claims and their legal equivalents.

What is claimed is:

1. A low-inventory method of making eyeglasses comprising the steps of:
    A) selecting a plurality of two lens units, each lens units comprising a first lens element and a second lens element wherein the first lens element is rigid and the second lens element is flexible,
        wherein the first and second lens elements are each configured to form a respective part of the two lens unit, and
        wherein each of the first and second lens elements have a thickness profile, and
        wherein the configurations of the thickness profiles of the first and second lenses in each two lens unit enable setting at least one of focus and astigmatism of the two-lens unit by adjustments of the relative positions of the two lenses in directions approximately perpendicular to a viewing direction;
    B) adjusting the two lens elements in the selected two-lens unit relative to each other to correct at least one of focus and astigmatism of a patient's eye;
    C) securing the second flexible lens and the first rigid lens element in fixed relation to one another and an eyeglasses frame.

2. The low-inventory method as in claim 1 wherein the thickness profiles are approximately given by the following three equations defining a thickness profile function for each of the two lens elements:

$$((\alpha v+1)^{-2} \partial^3 t/\partial u^3 + \alpha(\alpha v+1)^{-1} \partial^2 t/\partial v \partial u)|_{(u,v)=(0,0)} = 2A$$

$$(\partial^3 t/\partial v^2 \partial u)|_{(u,v)=(0,0)} = 2A$$

$$((\alpha v+1)^{-1} \partial^3 t/\partial v \partial u^2 - \alpha(\alpha v+1)^{-2} \partial^2 t/\partial u^2)|_{(u,v)=(0,0)} = 0,$$

where A for one lens element to be the complement, or substantially the complement, of the other lens element and where the thickness profile functions continuous, and the derivatives up to at least third order are continuous.

3. The low-inventory method as in claim 1 wherein the solutions to the thickness profile functions are approximately given by:

$$t=A[uv^2+2(\alpha v+1)(\alpha u-\sin(\alpha u))/\alpha^3]+B[2(\alpha v+1)(1-\cos(\alpha u))/\alpha^2]+C[v\sin(\alpha u)/\alpha-(\alpha u-\sin(\alpha u))/\alpha^2)]+Du+E+F(v)+F1(u,v)u^4+F2(v)u^3v+F3(v)u^2v^2+F4(v)uv^3,$$

where

F(v), F1(u,v), F2(v), F3(v), F4(v)

are any functions over the area of the lenses for which derivatives up to at least third order are continuous and at least one of F1(u,v), F2(v), F3(v) and F4(v) is non zero.

4. The low-inventory method as in claim 2 wherein said relative motion is linear and the thickness profile functions are approximately given by:

$$(\partial^3 t/\partial x^3)|_{(x,y)=(0,0)}=2A$$

$$(\partial^3 t/\partial x \partial y^2)|_{(x,y)=(0,0)}=2A$$

$$(\partial^3 t/\partial x^2 \partial y)|_{(x,y)=(0,0)}=0,$$

with the solution for each of the two lens elements being $$t=A(xy^2+\tfrac{1}{3}x^3)+Bx^2+Cxy+Dx+E+F(y)+F1(x,y)x^4+F2(y)x^3y+F3(y)x^2y^2+F4(y)xy^3$$

where at least one of F1, F2, F3 and F4 is non zero.

5. The low-inventory method as in claim 2 wherein said relative motion is pivotal and the thickness profile functions are approximately given by:

$$r_0^{-1}(r^{-2}\partial^3 t/\partial \theta^3 + r^{-1}\partial t/\partial r \partial \theta)|_{(r,\theta)=(r_0,0)}=2A$$

$$r_0^{-1}(\partial^3 t/\partial r^2 \partial \theta)|_{(r,\theta)=(r_0,0)}=2A$$

$$r_0^{-1}(r^{-1}\partial^3 t/\partial r \partial \theta^2 - r^{-2}\partial^2 t/\partial \theta^2)|_{(r,\theta)=(r_0,0)}=0,$$

with the solution for each of the two lens elements being:

$$t=Ar_0[(r^2+r_0^2)\theta-2rr_0\sin(\theta)]+B2r_0r(1-\cos(\theta))+Cr_0[r\sin(\theta)-r_0\theta]+Dr_0\theta+E+F(r)+F1(r,\theta)r_0^4\theta^4+F2(r)r_0^3(r-r_0)\theta^3+F3(r)r_0^2(r-r_0)^2\theta^2+F4(r)r_0(r-r_0)^3\theta,$$

where at least one of F1, F2, F3 and F4 are non zero.

6. The low-inventory method as in claim 1 wherein the rigid lens in each two-lens unit is fixed in a frame prior to delivery to the eyeglass maker.

7. The low-inventory method as in claim 1 wherein a plurality of two-lens units are provided in a plurality of models adapted to correct astigmatism in different directions in order to achieve the proper astigmatism direction after fixing the two lenses in eyeglasses.

8. The low-inventory method as in claim 1 and further comprising a step wherein an inventory of a plurality of two-lens lens units are contained in a portable device and used for making eyeglasses.

9. The low-inventory method as in claim 1 wherein and further comprising a step of selling eyeglasses from a vending machine.

10. The low-inventory method as in claim 1 wherein said relative motion of the lenses is primarily along the surface of a sphere.

11. The low-inventory method as in claim 10 wherein surface profiles for the mating surfaces of the first and second lens elements are approximately given by the following equation defining a surface profile function for each of the two lens elements: $r=AR(\sin(\phi)\cos(\theta)-\phi\cos(\theta_0))+R$.

12. The low-inventory method as in claim 1 wherein the indices of refraction of the first and second lens elements are different, and the relative magnitude of the Alvarez surfaces of the lenses are adjusted to compensate for the index mismatch.

13. The low-inventory method as in claim 1 wherein the flexible lens has a modified base curvature to form a suction cup with the hard lens for all orientations.

14. The low-inventory method as in claim 6 wherein the flexible lens is cut with the proper offset to achieve a specified prescription and then attached to the frame unit by mounting on the rigid lens.

15. The low-inventory method as in claim 6 wherein the flexible lens is attached to the rigid lens with an offset designed to achieve a specified prescription and then cut to remove excess material.

16. The low-inventory method as in claim 6 wherein the flexible lens position is determined by the patient looking through the frame, hard lens, and unattached soft lens, registering the best offset, cutting the flexible lens with said offset, and attaching to the frame unit with mounted rigid lens.

17. The low-inventory method as in claim 6 wherein the flexible lens position is determined by the patient looking through the frame, rigid lens, and unattached flexible lens, attaching the flexible lens at said offset, and removing an excess portion of the flexible lens material by cutting.

18. The low-inventory method as in claim 1 wherein the soft lens material sticks to the hard lens by contact and is attached by pressing to the hard lens.

19. The low-inventory method as in claim 1 wherein the flexible lens is attached by gluing to the rigid lens.

20. The low-inventory method as in claim 1 wherein the flexible lens is attached to the rigid lens around the perimeter by pressing to a double-sided tape ring.

21. The low-inventory method as in claim 1 wherein the flexible lens is attached to the frame and not attached to the rigid lens.

* * * * *